US008777343B2

(12) United States Patent
Ishikawa et al.

(10) Patent No.: US 8,777,343 B2
(45) Date of Patent: Jul. 15, 2014

(54) IMAGE PROCESSOR, IMAGE PROCESSING METHOD AND INKJET PRINTER INVOLVING A PRINT HEAD WITH PARALLEL NOZZLE ARRAYS

(75) Inventors: Tomokazu Ishikawa, Kawasaki (JP); Fumitaka Goto, Tokyo (JP); Mitsuhiro Ono, Tokyo (JP); Akitoshi Yamada, Yokohama (JP); Yugo Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/963,318

(22) Filed: Dec. 8, 2010

(65) Prior Publication Data

US 2011/0316911 A1 Dec. 29, 2011

(30) Foreign Application Priority Data

Jun. 24, 2010 (JP) ................................. 2010-144303

(51) Int. Cl.
*B41J 29/38* (2006.01)
*G06K 15/10* (2006.01)
(52) U.S. Cl.
CPC .................................... *G06K 15/107* (2013.01)
USPC ............................................................ 347/9
(58) Field of Classification Search
None
See application file for complete search history.

(56) References Cited

U.S. PATENT DOCUMENTS

| 6,511,143 B1* | 1/2003 | Ishikawa et al. ................... 347/9 |
| 6,511,146 B2 | 1/2003 | Ishikawa et al. ................. 347/15 |
| 7,139,908 B2 | 11/2006 | Hamamoto et al. ............... 713/2 |
| 7,484,821 B2* | 2/2009 | Sudo et al. ........................ 347/13 |
| 7,591,521 B2* | 9/2009 | Aruga .............................. 347/13 |
| 7,603,383 B2 | 10/2009 | Ishikawa ...................... 707/104.1 |
| 7,876,358 B2 | 1/2011 | Yamada et al. ............. 348/207.2 |
| 2006/0214957 A1* | 9/2006 | Wada ................................. 347/5 |
| 2006/0274099 A1* | 12/2006 | Jahana et al. .................... 347/15 |
| 2006/0274100 A1* | 12/2006 | Uji et al. .......................... 347/15 |
| 2007/0013956 A1 | 1/2007 | Mikami et al. ................. 358/296 |
| 2007/0242098 A1 | 10/2007 | Sudo et al. ....................... 347/40 |
| 2009/0219340 A1* | 9/2009 | Ochiai et al. .................... 347/40 |

FOREIGN PATENT DOCUMENTS

| CN | 101054018 A | 10/2007 |
| JP | 05-057965 A | 3/1993 |
| JP | 2000-103088 A | 4/2000 |
| JP | 2001-001510 A | 1/2001 |
| JP | 2001-150700 A | 6/2001 |
| JP | 2001-270155 A | 10/2001 |
| JP | 2002-144542 A | 5/2002 |
| JP | 2003-334939 A | 11/2003 |
| JP | 2004-122546 A | 4/2004 |
| JP | 2005-199692 A | 7/2005 |
| JP | 2010-017977 A | 1/2010 |

* cited by examiner

*Primary Examiner* — Geoffrey Mruk
*Assistant Examiner* — Bradley Thies
(74) *Attorney, Agent, or Firm* — Fitzpatrick, Cella, Harper & Scinto

(57) ABSTRACT

There is provided an image processing method in which in a full line type inkjet printer using a connecting head having an overlap region, even if a conveyance direction of a print medium is more or less inclined, a density change or degradation of graininess is not introduced. Therefore, an image data in a non-overlap region is distributed to a plurality of nozzle arrays such that ink is ejected from all the plurality of the nozzle arrays. On the other hand, a region where a print allowance rate changes in the overlap region is divided into plural regions, and the image data is distributed to the plurality of the nozzle arrays such that these regions are located to be shifted.

10 Claims, 21 Drawing Sheets

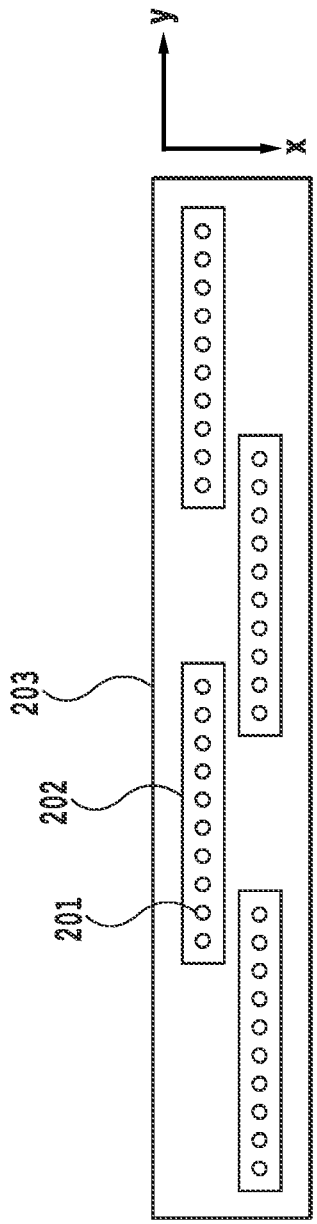
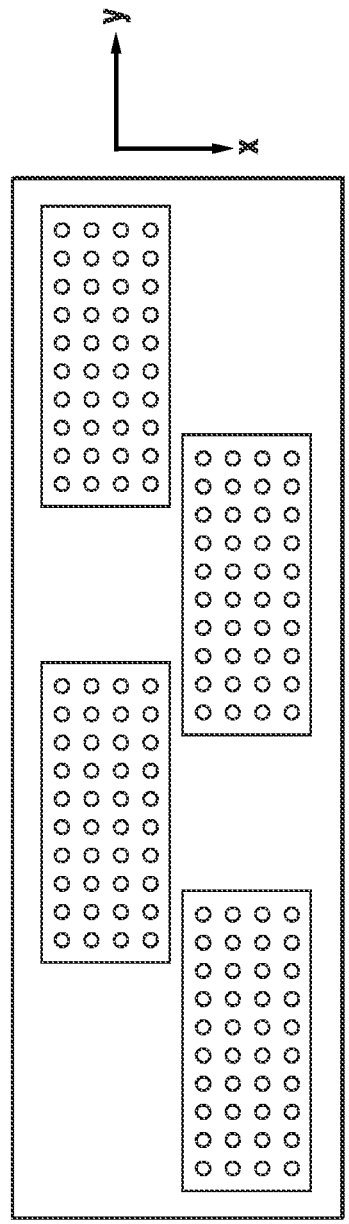
FIG. 1A PRIOR ART
FIG. 1B PRIOR ART

DISPERSION MATRIX A

|   | ● | 9 | 3 |
|---|---|---|---|
| 5 | 9 | 3 |   |
|   | 3 |   |   |

● BLACK CIRCLE IS
   PIXEL TO BE PROCESSED

FIG.14A

DISPERSION MATRIX B

|   |   | ● | 2 | 1 |
|---|---|---|---|---|
| 1 | 1 | 2 | 1 |   |
|   |   |   |   |   |

● BLACK CIRCLE IS
   PIXEL TO BE PROCESSED

FIG.14B

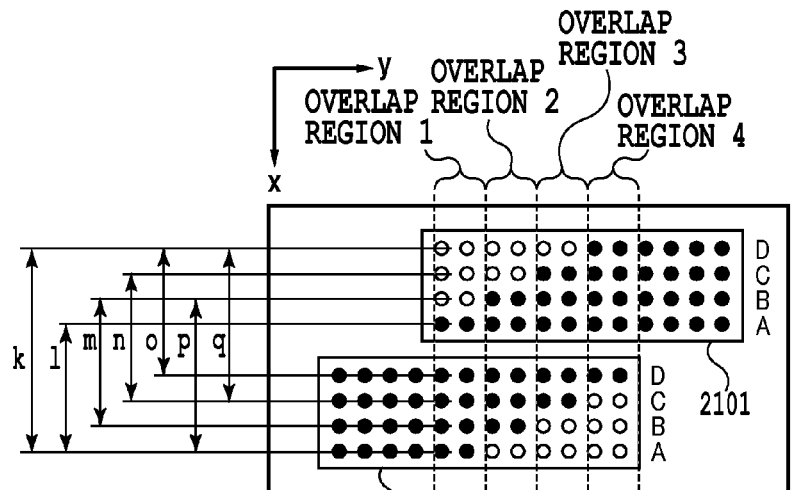
FIG.17A
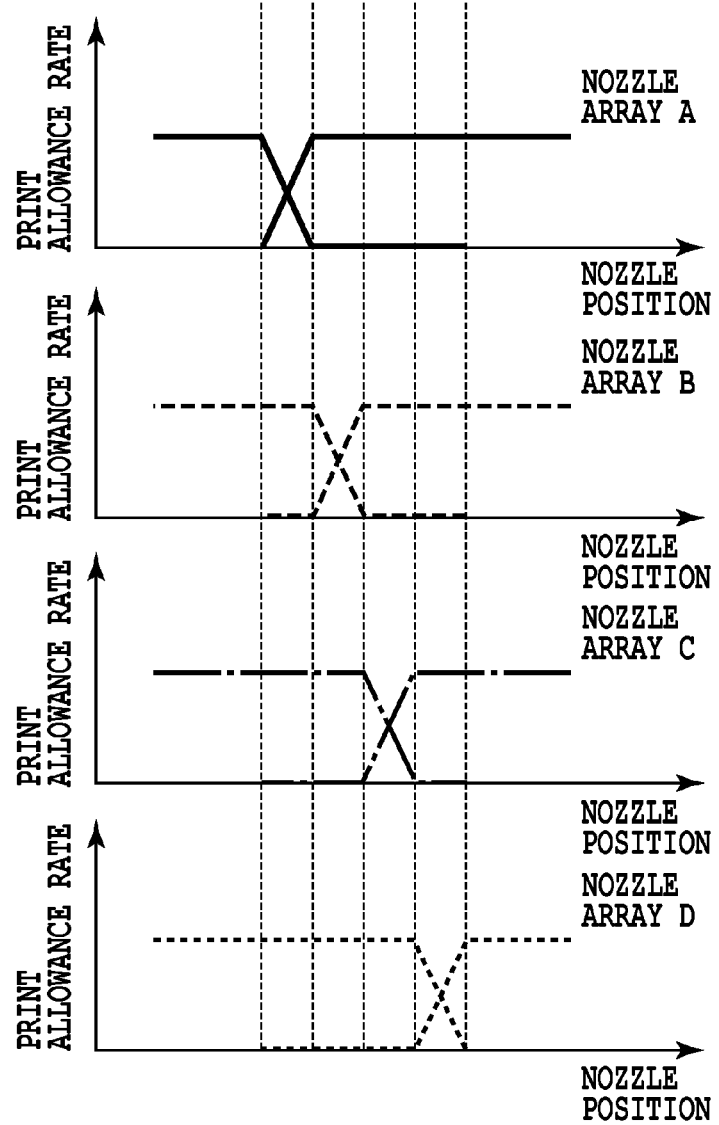
FIG.17B
FIG.17C
FIG.17D
FIG.17E

IMAGE PROCESSOR, IMAGE PROCESSING METHOD AND INKJET PRINTER INVOLVING A PRINT HEAD WITH PARALLEL NOZZLE ARRAYS

BACKGROUND OF THE INVENTION

1. Field of the Invention

The present invention relates to an image processing method used in printing an image on a print medium by using a connecting head in which a plurality of chips, each of which is provided with a nozzle array for ejecting ink of the same color, are arranged.

2. Description of the Related Art

There is conventionally provided a full line type inkjet printer in which, relative to a print head in which nozzles are arranged as wide as to cover a region corresponding to a width of a print medium, the print medium is conveyed in a direction intersecting with the arrangement direction of the nozzles, thus printing an image on the print medium. This full line type inkjet printer has recently attracted attention because of capability of the high speed output. This full line type inkjet printer adopts an elongated print head in which a great number of nozzles are arranged. However, when many nozzles are manufactured together for such a print head, a yield rate on the manufacturing process is degraded. Therefore, a recent full line type inkjet printer is generally manufactured such that a plurality of the same type chips, each of which has a predetermined number of nozzles arranged therein, are prepared and are arranged in such a manner that the nozzles are located successively.

FIG. 1A and FIG. 1B are diagrams each explaining a construction example of a connecting head disclosed in Japanese Patent Laid-Open No. H05-057965(1993). In FIG. 1A, a plurality of chips 202, in each of which a plurality of nozzles 201 are formed, are arranged to extend in y direction equal to a nozzle arrangement direction of each chip. At this time, neighboring chips each other are arranged in y direction by being alternately shifted in x direction in such a manner that an arrangement pitch of nozzles in y direction is constant also in a connecting portion (overlap region) between one of the chips and the other. The connecting head is generally configured in such a manner that a plurality of chips are arranged successively in y direction to thus form a predetermined overlap region of the chips. Ink is ejected in a constant frequency from the plurality of the nozzles and at the same time the print medium is conveyed in x direction at a speed corresponding to such frequency, thus printing an image on the print medium.

FIG. 1B is a diagram showing an example in which four nozzle arrays are formed on one chip. In the construction where a plurality of nozzle arrays are thus formed on one chip, the same line extending in the conveyance direction (x direction) on the print medium can be alternately printed by a plurality of nozzles. Therefore, even if a nozzle having an ejection defect such as a non-ejection or a shift of an ejection direction is included in the chip, the dot printed by such a defect nozzle does not exist successively in x direction and therefore an uniform image with a scattering ejection characteristic can be outputted. In the recent full line type inkjet printer, a plurality of nozzle arrays is generally formed on one chip as shown in FIG. 1B.

Incidentally in the overlap region of the aforementioned connecting head, the number of nozzles printing the same line extending in x direction is more than that in the non-connecting region. For example, in a case of FIG. 1A, the number of the nozzle printing the same line is one in the non-overlap region and the number of the nozzle printing the same line is two in the overlap region. In a case of FIG. 1B, the number of the nozzle printing the same line is four in the non-overlap region and the number of the nozzle printing the same line is eight in the overlap region. In Japanese Patent Laid-Open No. H05-057965(1993), continuity of dots in x direction is maintained or surface irregularity due to variations of the ejection characteristic in y direction is restricted by alternately printing dots with all the nozzles thus included in the overlap region. Particularly since a so-called gradation mask for gradually changing a printing rate (print allowance rate) between plural chips in the overlap region corresponding to a nozzle position is used in Japanese Patent Laid-Open No. H05-057965(1993), the continuity of the dots in y direction is more smoothed.

However, in the printing in the overlap region, a location region of the nozzles used for the printing is longer in x direction as compared to that in the printing in the non-overlap region. Therefore, it is confirmed that in a case where the print medium conveyed in x direction is slightly inclined, the influence due to the inclination tends to easily occur in an image.

FIG. 2A and FIG. 2B are diagrams explaining a state between a conveyance direction of the print medium and an image adverse effect in the overlap region of chips. For simplification herein, there is shown an example of a print head 500 where a chip 501 and a chip 502 are arranged in such a manner that each chip has two nozzle arrays formed thereon to have an overlap region corresponding to four nozzles of each nozzle array in y direction.

By referring to FIG. 2A, the same line extending in x direction is printed by four nozzles as a sum of two nozzles in the chip 501 and two nozzles in the chip 502 in a region included in the overlap region. When the print medium is accurately conveyed in x direction to the print head 500, dots to be printed by nozzles 503A, 503B, 504A and 504B are printed on the same line 505 extending in x direction. That is, if ink is ejected toward the same position on the print medium by the nozzles 503B and 504A, two overlapped dots as denoted at 506 are formed on the print medium.

On the other hand, FIG. 2B is a case where the print medium is conveyed on an inclination of θ to x direction. In this case, dots printed by the nozzles 503A, 503B, 504A and 504B are not printed on the same line 505 extending in x direction. That is, if ink is ejected toward the same position on the print medium by the nozzles 503B and 504A, two separate dots as shown by a dot 508 and a dot 509 are formed on the print medium. At this time, a distance c between the two separate dots can be, in a case where a distance between the nozzle 503B and the nozzle 504A in x direction is defined as a, expressed by a formula of c a×tan θ.

There are some cases where such a shift in the print position between nozzle arrays in an overlap region changes a coverage of the dot on the print medium to give an influence on an image density or makes graininess of the dot easily stand out to degrade an image itself. In addition, as a difference in density or graininess between the overlap region and the non-overlap region can be confirmed, this difference is recognized as unevenness in the image.

SUMMARY OF THE INVENTION

The present invention is made in view of the foregoing problem and an object of the present invention is to provide an image processing method by which in a full line type inkjet printer using a connecting head having an overlap region, even if a conveyance direction of a print medium is more or less inclined, an image density change or degradation of graininess is not brought about.

The first aspect of the present invention is an image processor for processing an image data used in printing an image on a print medium by using a print head provided with a plurality of chips each having a plurality of nozzle arrays in each of which a plurality of nozzles for ejecting ink are arranged in a first direction, wherein the plurality of nozzle arrays are arranged in parallel with each other in a second direction intersecting with the first direction in each of chips and the plurality of chips are arranged so that an overlap region is provided in the second direction, comprising: a distributing unit configured to distribute an image data corresponding to the overlap region to the plurality of the nozzle arrays on two chips corresponding to the overlap region, wherein the distributing unit distributes the image data corresponding to the overlap region in such a manner that a plurality of regions in each of which a print allowance rate of at least one nozzle array on each of the two chips reduces to be smaller toward an end portion of the chip exist in the overlap region.

The second aspect of the present invention is an image processing method for processing an image data used in printing an image on a print medium by using a print head provided with a plurality of chips each having a plurality of nozzle arrays in each of which a plurality of nozzles for ejecting ink are arranged in a first direction, wherein the plurality of nozzle arrays are arranged in parallel with each other in a second direction intersecting with the first direction in each of chips and the plurality of chips are arranged so that an overlap region is provided in the second direction, comprising the steps of: distributing an image data corresponding to the overlap region to the plurality of the nozzle arrays on two chips corresponding to the overlap region, wherein the distributing step distributes the image data corresponding to the overlap region in such a manner that a plurality of regions in each of which a print allowance rate of at least one nozzle array on each of the two chips reduces to be smaller toward an end portion of the chip exist in the overlap region.

The third aspect of the present invention is an inkjet printer comprising: a printing unit configured to print an image on a print medium by using a print head provided with a plurality of chips each having a plurality of nozzle arrays in each of which a plurality of nozzles for ejecting ink are arranged in a first direction, wherein the plurality of nozzle arrays are arranged in parallel with each other in a second direction intersecting with the first direction in each of chips and the plurality of chips are arranged so that an overlap region is provided in the second direction, a distributing unit configured to distribute an image data corresponding to the overlap region to the plurality of the nozzle arrays on two chips corresponding to the overlap region, wherein the distributing unit distributes the image data corresponding to the overlap region in such a manner that a plurality of regions in each of which a print allowance rate of at least one nozzle array on each of the two chips reduces to be smaller toward an end portion of the chip exist in the overlap region.

Further features of the present invention will become apparent from the following description of exemplary embodiments (with reference to the attached drawings).

BRIEF DESCRIPTION OF THE DRAWINGS

FIGS. 1A and 1B are diagrams explaining a constriction example of a connecting head;

FIGS. 14A and 14B are diagrams showing an example of an error dispersion matrix;

FIGS. 17A to 17E are diagrams explaining a use state of nozzles in the vicinity of the overlap region;

DESCRIPTION OF THE EMBODIMENTS

Figure 2A:
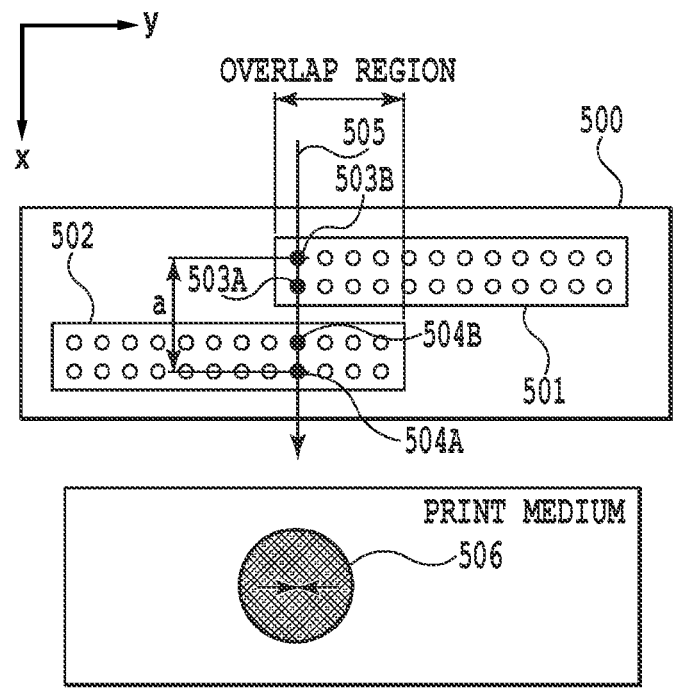
FIGS. 2A and 2B are diagrams explaining a conveyance direction of a print medium and a state of an image adverse effect in an overlap region.
Figure 2B:
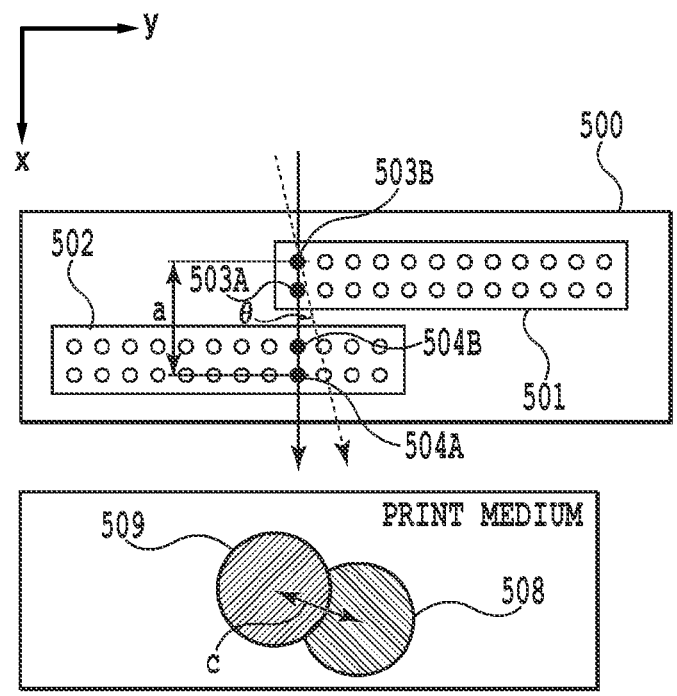
Figure 3:
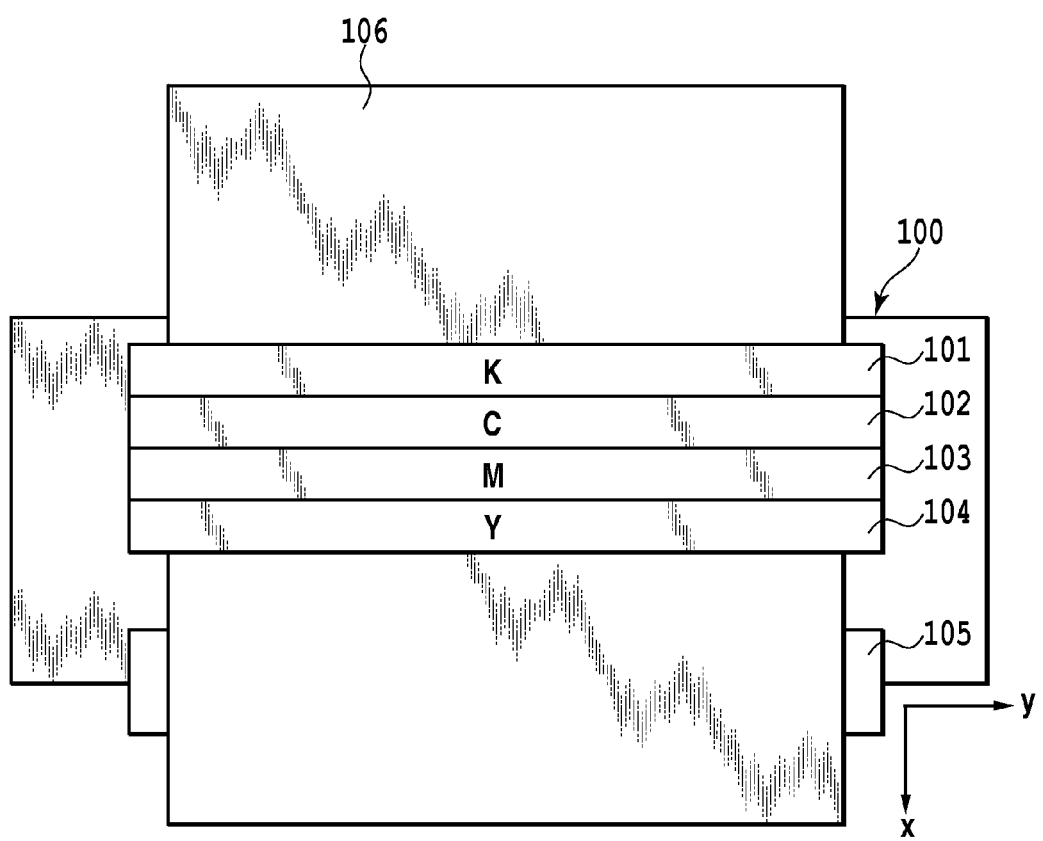
FIG. 3 is a top view of a full line type inkjet printer.

FIG. 3 is a top view showing a full line type inkjet printer serving as an image processor in the present invention. A print medium 106 is conveyed at a predetermined speed in x direction (first direction) of the figure by rotating a conveyance roller 105, and four connecting heads 101 to 104 each ejecting black, cyan, magenta or yellow ink are arranged in parallel in the conveyance path. Each of the connecting heads will be in detail described later, but chips each having two nozzle arrays are basically arranged successively in y direction (second direction) as wide as the print medium 106 as shown in FIGS. 2A and 2B. When the print heads 101 to 104 eject ink on the print medium conveyed in x direction at a predetermined speed in a predetermined frequency corresponding to the conveyance speed, an image of one page is printed on the print medium.

Figure 4:
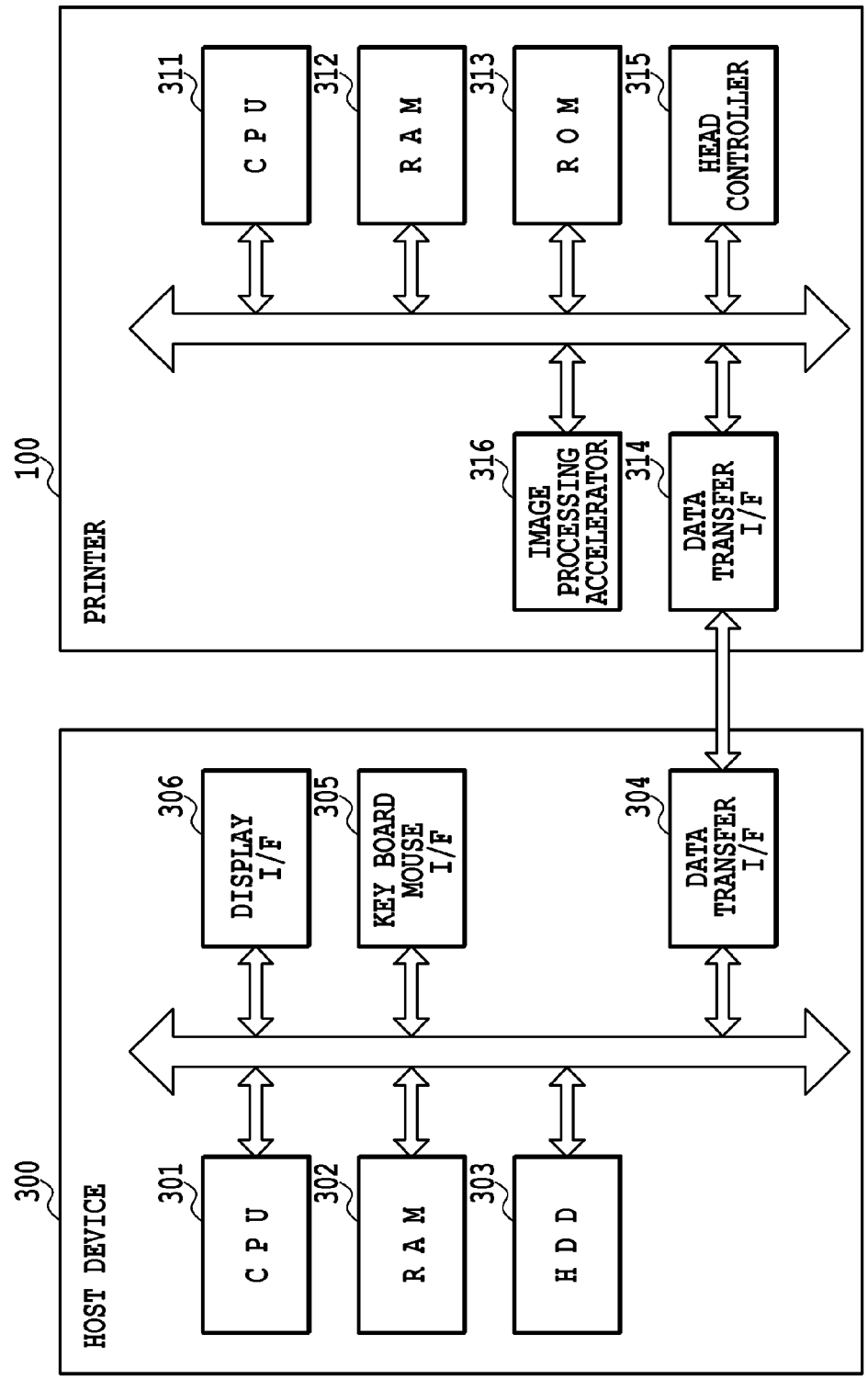
FIG. 4 is a diagram showing a system construction example applicable to the present invention.

FIG. 4 is a diagram showing a system construction example applicable to the present invention. An inkjet printer 100 in the present embodiment is connected to a host device 300 as a supplier of image data. The host device 300 is configured mainly by the following block. In the host device 300, a CPU 301 performs the processing of the entire printer based upon programs stored in a hard disc HDD 303 and a RAM 302. The RAM 302 is a volatile storage and temporarily stores programs and data therein. The HDD 303 is an involatile storage and stores programs and data therein. A data transfer I/F 304 is an interface for establishing communications of data with the printer 100. A key board mouse I/F 305 is an I/F for controlling a HID (human interface device) such as a key board or a mouse and receives input from a user. A display I/F 306 is a block for displaying data on a display.

On the other hand, the printer 100 is configured mainly by the following block. A CPU 311 performs the processing based upon programs stored in a ROM 313 and a RAM 312. The RAM 312 is a volatile storage and temporarily stores programs and data therein. The ROM 313 is an involatile storage and stores programs and data therein. A data transfer I/F 314 is a block for establishing communications of data with the host device 300. A physical connecting method between the data transfer I/F 304 in the host device 300 and the data transfer I/F 314 in the printer 100 includes use of a USB, an IEEE1324, a LAN or the like.

A head controller 315 supplies print data to the print head for actually performing ejection to perform print control. As a specific realized example thereof, there is a method in which the head controller 315 is designed to read necessary parameters and data from a predetermined address of the RAM 312. When the CPU 311 writes the necessary parameter and data in the predetermined address of the RAM 312, the head controller 315 is activated to perform an actual print operation.

An image processing accelerator 316 is a block for performing the image processing at a higher speed than the CPU 311. As a specific realized example thereof, there is a method in which the image processing accelerator 316 is designed to read necessary parameters and data from a predetermined address of the RAM 312. When the CPU 311 writes the necessary parameter and data in the predetermined address of the RAM 312, the image processing accelerator 316 is activated to perform a print operation. The image processing accelerator 316 is not necessarily a required block, but only the processing by the CPU 311 may realize the image processing.

Figure 5:
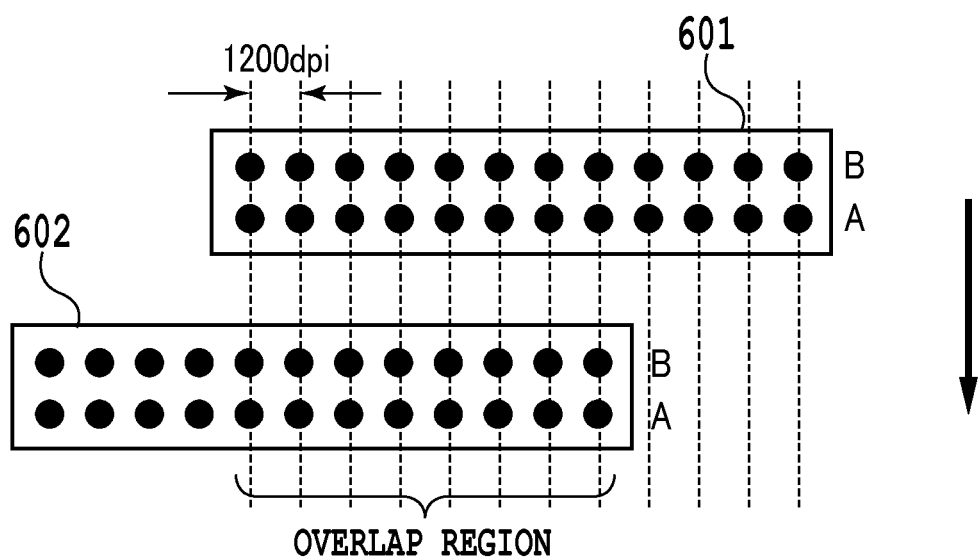
FIG. 5 is a diagram explaining an outline of an overlap region in the connecting head.

FIG. 5 is a diagram explaining an outline of the overlap region in the connecting heads 101 to 104 used in the present embodiment. An actual print head is configured such that a plurality of chips each having a plurality of nozzle arrays are arranged in y direction intersecting with the conveyance direction of the printing medium. Herein, for simplification, FIG. 5 shows an overlap region provided between two chips 601 and 602. Each of the chips 601 and 602 is provided with two nozzle arrays of nozzle array A and nozzle array B, and each nozzle array is provided with a plurality of nozzles for ejecting ink as droplets arranged in y direction at a density of 1200 dpi (dot/inch). In the present embodiment, for simplification, each nozzle array is provided with 12 nozzles, and eight nozzles among them are included in the overlap region.

Hereinafter, the featuring image processing in the present invention will be specifically explained with reference to several embodiments.

First Embodiment

Figure 6:
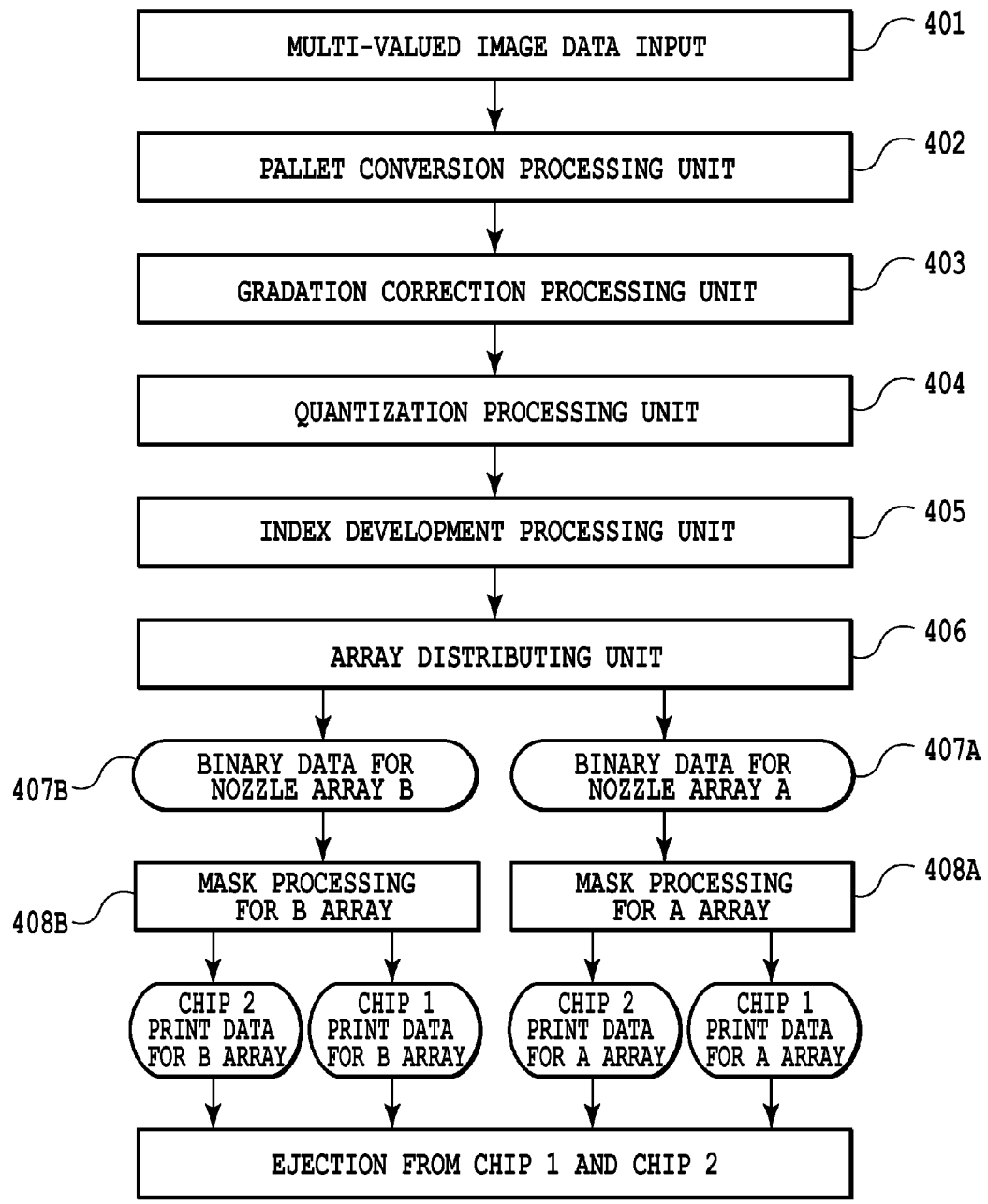
FIG. 6 is a block diagram explaining image processing in a case of printing dots using the connecting head.

FIG. 6 is a block diagram explaining the process of the image processing in a case of printing dots using the connecting heads 101 to 104. In the present embodiment, a multi-valued image data input unit 401, a pallet conversion processing unit 402, a gradation correction processing unit 403 and a quantization processing unit 404 may be regarded as units provided in the CPU 301 of the host device 300.

Multi-valued image data of RGB (256 values) are inputted from the multi-valued image data input unit 401. This input image data (multi-valued RGB data) is converted into four sets of multi-valued image data (multi-valued data for each ink) corresponding to ink colors (CMYK) by the pallet conversion processing unit 402 for each pixel. The pallet conversion processing unit 402 is provided with a three-dimensional lookup table (LUT) in which RGB values and CMYK values are associated with each other one to one. The RGB values are converted into multi-valued data for each ink (C, M, Y and K) at once by using the LUT. To an input value shifted out of a table lattice point value, an output value may be calculated in interpolation from an output value of the nearby lattice point.

The following processing is performed independently from and in parallel with each other for each of CMYK. In the gradation correction processing unit 403, a primary conversion processing is performed respectively to the multi-valued data for each ink (C, M, Y and K) so that a density of the image printed on the print medium is linear to the input density data. In addition, in the quantization processing unit 404, binarization processing (quantization processing) is performed to the converted multi-valued data of each color (C, M, Y and K).

Here, as this process is explained by taking black (K) as an example, in the quantization processing unit 404 the quantization processing is performed to multi-valued data for black (K) to quantize black multi-valued data of 256 values to multi-valued data of 17 gradations in the present embodiment. On this occasion, the present embodiment adopts a general multi-valued error diffusion system as the quantization processing. However, the present invention is not limited to such quantization processing, and for example, the present invention may adopt a pseudo intermediate gradation processing such as a known dither matrix process or may adopt simple quantization depending on an application of an output image.

The data of 17 gradations of each color quantized are sent from the host device 300 to the printer 100. The following processing is performed by the CPU 311 or the image processing accelerator 316 in the printer 100.

In the printer 100, first an index development is performed in an index development processing unit 405. In the ROM 313, an index pattern in which print (1) or non-print (0) is defined for each of 16 pixels of 1200 dpi is prepared for each of 17 valued data of 300 dpi. By performing the data conversion by referring to these patterns, the multi-valued data of 17 values of 300 dpi are converted into binary data of 1200 dpi.

In a next array distributing unit 406, the binary data of each color is distributed to any of nozzle array A and nozzle array B provided in each chip. As a result, the individual binary data is distributed to a binary data 407A for nozzle array A printed by nozzles of A array and a binary data 407B for nozzle array B printed by nozzles of B array.

Further, mask processing 408A for nozzle array A is performed to the binary data 407A for nozzle array A, which is divided into data corresponding to a plurality of chips arranged on the print head. In addition, mask processing 408B for nozzle array B is performed to the binary data 407B for nozzle array B, which is likewise divided into data corresponding to a plurality of chips arranged on the print head. The mask processing uses a mask pattern which is in advance prepared for each of a plurality of chips and in which allowance or non-allowance of a print is defined depending on a position of each data. In addition, the individual data is actually printed by a chip corresponding to the mask pattern in which the print in the position of the data is allowed.

At this time, in a case where the position of the binary data of interest is contained in the non-overlap region of the print head, since the chip capable of using the corresponding data is limited to one chip, each mask pattern is produced such that the print is performed in that chip. On the other hand, in a case where the position of the binary data of interest is contained in the overlap region of the print head, since two chips are capable of using the corresponding data, each mask pattern is produced such that the print is performed in the two chips. FIG. 6 shows a state where in the print head shown in FIG. 5, each of the binary data is divided into two nozzle arrays A and B in two chips 601 and 602 by the mask processing 408A for nozzle array A and the mask processing 408B for nozzle array B. A distributing method (dividing method) of the print data to the two chips in the overlap region will be in detail explained later. In addition, the aforementioned mask pattern is in advance stored in the ROM 313 within the printer in the same way as the index pattern.

When a series of the processing as explained above is completed, an actual ejection operation is performed according to the binary data corresponding to each chip and each nozzle array.

Figure 7A:
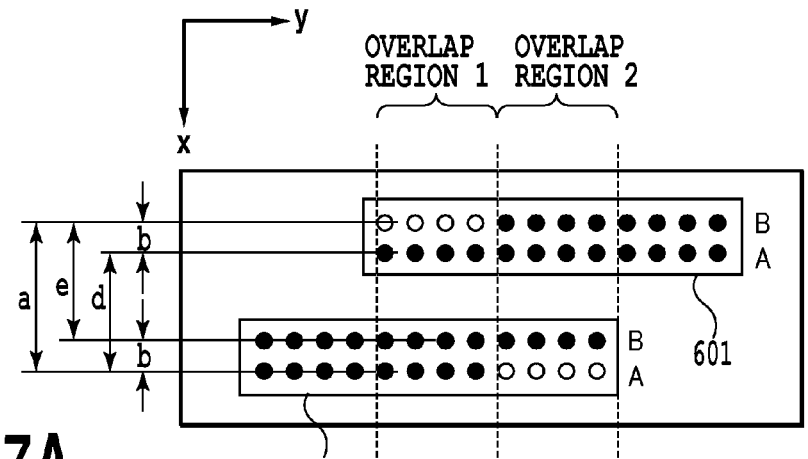
FIGS. 7A to 7C are diagrams explaining a use state of nozzles in the vicinity of the overlap region.
Figure 7B:
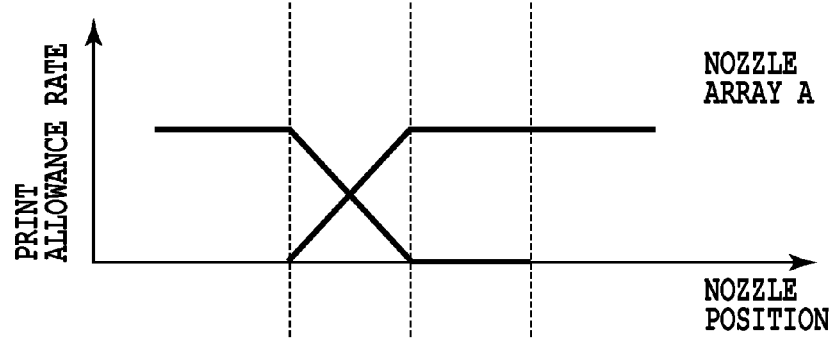
Figure 7C:
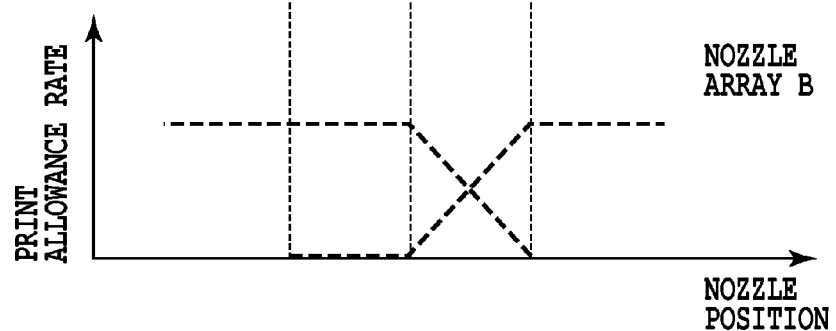

FIGS. 7A to 7C are diagrams explaining a use state of individual nozzles in the vicinity of the overlap region in the present embodiment. In FIG. 7A, in individual nozzles arranged in the two chips 601 and 602, the nozzle used for the printing is shown in a black circle and the nozzle not used for the printing is shown in a white circle. FIG. 7B shows a print allowance rate corresponding to a nozzle position of each of the chip 601 and the chip 602 in nozzle array A, and FIG. 7C shows a print allowance rate corresponding to a nozzle position of each of the chip 601 and the chip 602 in nozzle array B. The print allowance rate means a rate of pixels on which dots are actually allowed to be printed according to the aforementioned mask pattern, among positions of pixels in which dots are printable by respective nozzles, and the maximum rate is 100% and the minimum rate is 0%. However, in the present embodiment, since the binary data is distributed, by the array distributing unit 406, to the binary data for nozzle array A and the binary data for nozzle array B by 50% respectively, the maximum value of the print allowance rate in each of FIGS. 7B and 7C is 50%. It should be noted that the nozzle having the print allowance rate of 0% is shown in a white circle in FIG. 7A.

The overlap region corresponding to eight nozzles is divided into overlap region 1 corresponding to four nozzles and overlap region 2 corresponding to four nozzles, to each of which different processing is performed. In overlap region 1, dots are not printed by nozzle array B of the chip 601 and dots are printed by three arrays of nozzle array A and nozzle array B of the chip 602 and nozzle array A of the chip 601. In this region, the print allowance rate of nozzle array B of the chip 602 is 50% without variations. The print allowance rate of nozzle array A in the chip 601 and the print allowance rate of the nozzle array A in the chip 602, as shown in FIG. 7B, change depending on the position, and the two print allowance rates are combined to become 50% without variations. That is, in overlap region 1, a sum of the print allowance rates of nozzle array B in the chip 602, nozzle array A in the chip 601 and nozzle array A in the chip 602 is 100%.

On the other hand, in overlap region 2, dots are not printed by nozzle array A of the chip 602 and dots are printed by three arrays of nozzle array A and nozzle array B of the chip 601 and nozzle array B of the chip 602. In this region, the print allowance rate of nozzle array A of the chip 601 is 50% without variations. The print allowance rate of nozzle array B in the chip 601 and the print allowance rate of the nozzle array B in the chip 602, as shown in FIG. 7C, change depending on the position, and the two print allowance rates are combined to become 50% without variations. That is, in overlap region 2, a sum of the print allowance rates of nozzle array A in the chip 601, nozzle array B in the chip 601 and nozzle array B in the chip 602 is 100%.

In the present embodiment, the array distributing processing or the mask processing is performed so as to satisfy the above relation. In a case of performing the above print, in overlap region 1, the print allowance rate of nozzle array A in each of the chips 601 and 602 changes among four nozzle arrays of the chips 601 and 602, and in overlap region 2, the print allowance rate of nozzle array B in each of the chips 601 and 602 changes. That is, the present embodiment has the feature that, in a case where each of the chips 601 and 602 is provided with two arrays of nozzle array A and nozzle array B, the region in which the print allowance rate of the four nozzle arrays changes is not defined as one region, but is divided into two regions which are shifted from each other. In doing so, in overlap region 1, a width in x direction of three nozzle arrays used for printing corresponds to a distance d between nozzle array A in the chip 601 and nozzle array A in the chip 602. In addition, in overlap region 2, a width in x direction of three nozzle arrays used for printing corresponds to a distance e between nozzle array B in the chip 601 and nozzle array B in the chip 602. Any of the distances d and e is smaller than a width of four nozzle arrays, that is, a distance a in x direction between nozzle array B in the chip 601 and nozzle array A in the chip 602. Therefore, even if the inclination of the conveyance of the print medium occurs as explained in FIG. 2B, a distance between two separated dots is expressed in a formula of c=d×tan θ(or e×tan θ)<a×tan θ, and the print position shift is restricted to be smaller than in a case of using all the four nozzle arrays.

Considering the construction that the region in which the print allowance rate of the four nozzle arrays in the chips 601 and 602 changes is divided into two regions and the two regions are shifted from each other, for example, the following construction may be also included in that construction. That is, in overlap region 1, dots can be printed by three arrays of nozzle array B in the chip 601, nozzle array B in the chip 602 and nozzle array A in the chip 602. In addition, the print allowance rate of the nozzle array B in the chip 602 is constant as 50% and the print allowance rate of each of nozzle array B in the chip 601 and nozzle array A in the chip 602 is changed. On the other hand, in overlap region 2, dots can be printed by three arrays of nozzle array A in the chip 601, nozzle array B in the chip 601 and nozzle array B in the chip 602. In addition, the print allowance rate of the nozzle array A in the chip 601 is constant as 50% and the print allowance rate of each of nozzle array B in the chip 601 and nozzle array B in the chip 602 is changed.

According to this construction, in overlap region 1, the width in x direction of three nozzle arrays used for the printing corresponds to a distance a between nozzle array B in the chip 601 and nozzle array A in the chip 602 and stays to be equal to the width at the time of using four nozzle arrays. However, in overlap region 2, the width in x direction of three nozzle arrays used for the printing corresponds to a distance e between nozzle array B in the chip 601 and nozzle array B in the chip 602 to enable the print position shift to be restricted to be small. By thus dividing the region, in which the print allowance rate changes, into plural regions, both of the two nozzle arrays positioned at the outermost side in the conveyance direction are not used in at least one of the regions. Therefore, a density change or degradation of graininess can be reduced in at least a part of the overlap region. However, it is preferable that the print data is distributed to the nozzle arrays such that, in all the regions where the print allowance rate changes, at least one of the nozzle arrays positioned in the outermost side in the conveyance direction among a plurality of nozzle arrays is not used for printing as shown in FIGS. 7A to 7C.

As explained above, according to the present embodiment, even in a case where the inclination is contained in the conveyance direction of the print medium, it is possible to restrict the print position shift between dots to prevent the density change or the graininess from standing out.

Figure 8A:
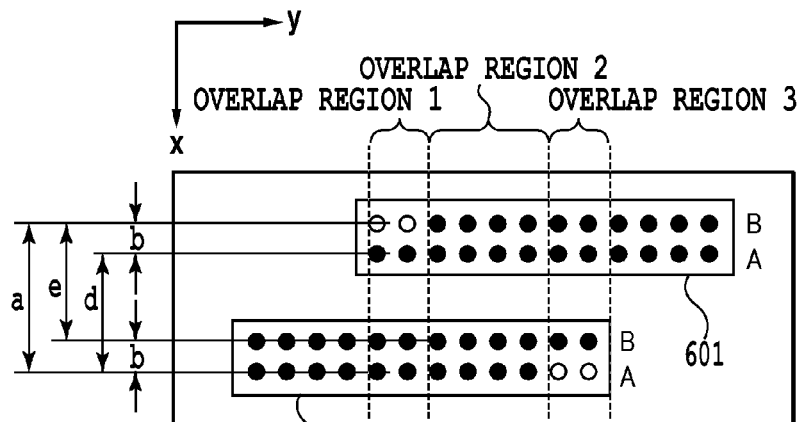
FIGS. 8A to 8C are diagrams explaining another example of a use state of nozzles in the vicinity of the overlap region.
Figure 8B:
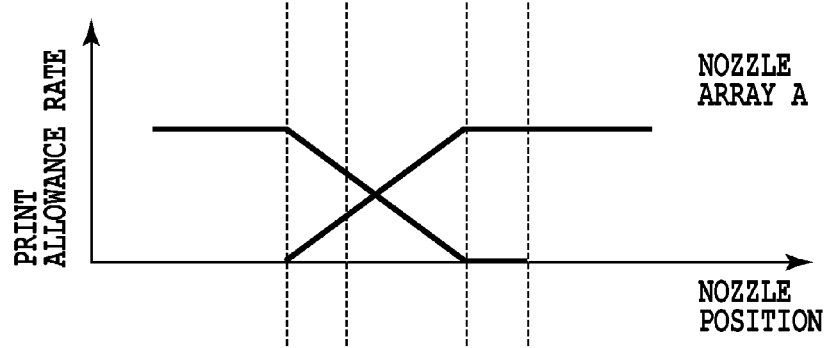
Figure 8C:
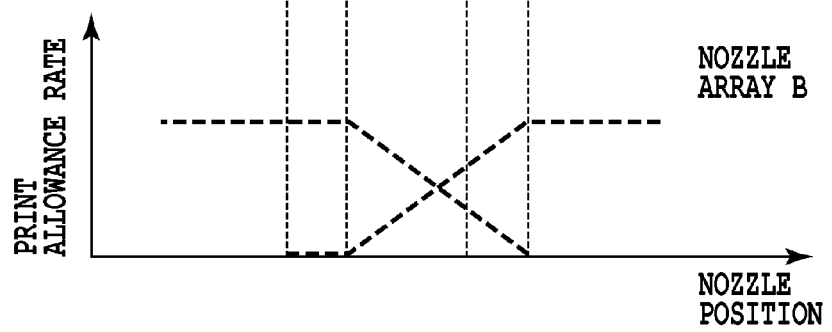

FIGS. 8A to 8C are diagrams explaining another example of a use state of individual nozzles in the vicinity of the overlap region in the present embodiment in the same way as in FIGS. 7A to 7C.

In the present embodiment, the overlap region corresponding to eight nozzles is divided into overlap region corresponding to two nozzles and overlap region 2 corresponding to four nozzles and overlap region 3 corresponding to two nozzles, to each of which different processing is performed. In overlap region 1, dots are not printed by nozzle array B of the chip 601 and dots are printed by three arrays of nozzle array A and nozzle array B of the chip 602 and nozzle array A of the chip 601. In this region, the print allowance rate of nozzle array B of the chip 602 is 50% without variations. The print allowance rate of nozzle array A in the chip 601 and the print allowance rate of the nozzle array A in the chip 602, as shown in FIG. 8B, change depending on the position, and the two print allowance rates are combined to become 50% without variations. That is, in overlap region 1, a sum of the print allowance rates of nozzle array B in the chip 602, nozzle array A in the chip 601 and nozzle array A in the chip 602 is 100%.

In overlap region 2, dots are printed by all the nozzle arrays of nozzle array A in the chip 601, nozzle array A in the chip 602, nozzle array B in the chip 601 and nozzle array B in the chip 602. Specially the print allowance rate of nozzle array A in the chip 601 and the print allowance rate of the nozzle array A in the chip 602, as shown in FIG. 8B, change depending on the position, and the two print allowance rates are combined to become 50% without variations. In addition, the print allowance rate of nozzle array B in the chip 601, and nozzle array B in the chip 602 also, as shown in FIG. 8C, changes depending on the position, and the two print allowance rates are combined to become 50% without variations. In addition, in overlap region 2, a sum of the print allowance rates of nozzle array A in the chip 601, nozzle array B in the chip 601, nozzle array A in the chip 602 and nozzle array B in the chip 602 is 100%.

On the other hand, in overlap region 3, dots are not printed by nozzle array A of the chip 602 and dots are printed by three arrays of nozzle array A and nozzle array B of the chip 601 and nozzle array B of the chip 602. In this region, the print allowance rate of nozzle array A of the chip 601 is 50% without variations. The print allowance rate of nozzle array B in the chip 601 and the print allowance rate of the nozzle array B in the chip 602, as shown in FIG. 8C, change depending on the position, and the two print allowance rates are combined to become 50% without variations. That is, in overlap region 3, a sum of the print allowance rates of nozzle array B in the chip 601, nozzle array A in the chip 601 and nozzle array B in the chip 602 is 100%.

In the present embodiment, in overlap region 1 and in overlap region 2, the print allowance rate of nozzle array A in each of the chips 601 and 602 changes among the four nozzle arrays of the chips 601 and 602, and in overlap region 2 and in overlap region 3, the print allowance rate of nozzle array B in each of the chips 601 and 602 changes. In a case where the region in which the print allowance rate of the four nozzle arrays in the two chips 601 and 602 changes is thus divided into two regions which are shifted from each other, a part thereof may overlap. It should be noted that in reverse, the regions in which the print allowance rate changes may be located away from each other.

In overlap regions 1 and 3, since each of widths e and d in x direction of nozzle arrays to be used is smaller than a width a in x direction of four nozzle arrays, it is possible to restrict the print position shift due to an inclination of the conveyance for the same reason as one explained in FIGS. 7A to 7C. However, in overlap region 2, since all the four nozzle arrays are used, it is not possible to restrict the print position shift due the inclination of the conveyance. However, according to the construction in FIGS. 8A to 8C, since the print allowance rate can be more gradually changed to the nozzle position than in FIGS. 7A to 7C, the effect of the gradation mask disclosed in Japanese Patent Laid-Open No. H05-057965(1993) can be more achieved. It should be noted that in FIGS. 8A to 8C, an example in which regions where the print allowance rate changes overlap partially is shown as another example of the present embodiment, but in reverse, the regions where the print allowance rate changes may be located to be separated from each other in the overlap region.

According to the present embodiment as described above, the region where the print allowance rate changes in the overlap region is divided into a plurality of regions which exist in the overlap region. Therefore, in at least a part in the overlap region, the print position shift between dots can be restricted to prevent the density change or the graininess from standing out. Particularly when, the print data, in all the regions where the print allowance rate changes, is distributed to the plurality of nozzle arrays such that at least one of nozzle arrays positioned at the outermost side in the conveyance direction among a plurality of nozzle arrays is not used for printing, the effect of preventing the density change or the graininess from standing out is further enhanced.

Modification 1 of First Embodiment

Figure 9:
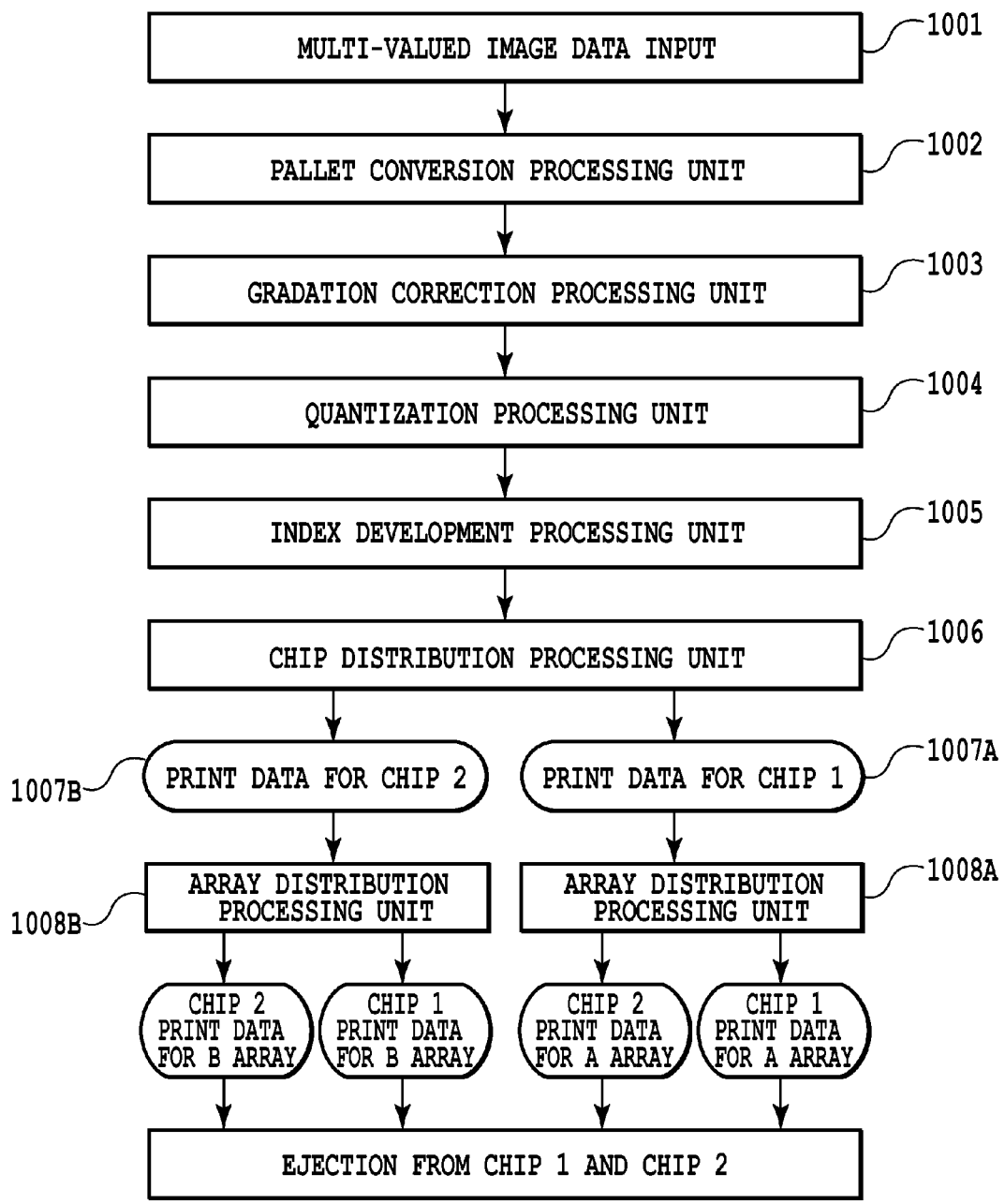
FIG. 9 is a block diagram showing image processing in a case of printing dots using the connecting head.

FIG. 9 is a block diagram explaining the process of image processing in the present modification in a case of printing dots using the connecting heads 101 to 104. Since the processing until the index development processing unit 1005 is the same as in the first embodiment shown in FIG. 6, an explanation thereof is eliminated.

In the present modification, in a chip distribution processing unit 1006, the binary data of each color received from the index development processing unit 1005 is distributed to a plurality of chips. As a result, the individual binary data is distributed to a binary data 1007A printed by a first chip and a binary data 1007B printed by a second chip. Thereafter, array distribution processing 1008A for the first chip is performed to the binary data 1007A for the first chip, which is distributed into either one of nozzle array A and nozzle array B arranged in the first chip. In addition, array distribution processing 1008B for the second chip is performed to the binary data 1007B for the second chip, which is also distributed into either one of nozzle array A and nozzle array B arranged in the second chip. When a series of the processing as explained above is completed, an actual ejection operation is performed according to the binary data corresponding to each chip and each nozzle array. As described above, when the data inputted from the index development processing, is first distributed to each chip and is then distributed to each nozzle array, the use state of each nozzle in the vicinity of the overlap region can be made in the same way as in FIGS. 7A to 7C or in FIGS. 8A to 8C. Therefore, even in a case of performing the image processing according to the process shown in FIG. 9, the effect similar to that of the above embodiment can be obtained.

Modification 2 of First Embodiment

Figure 10:
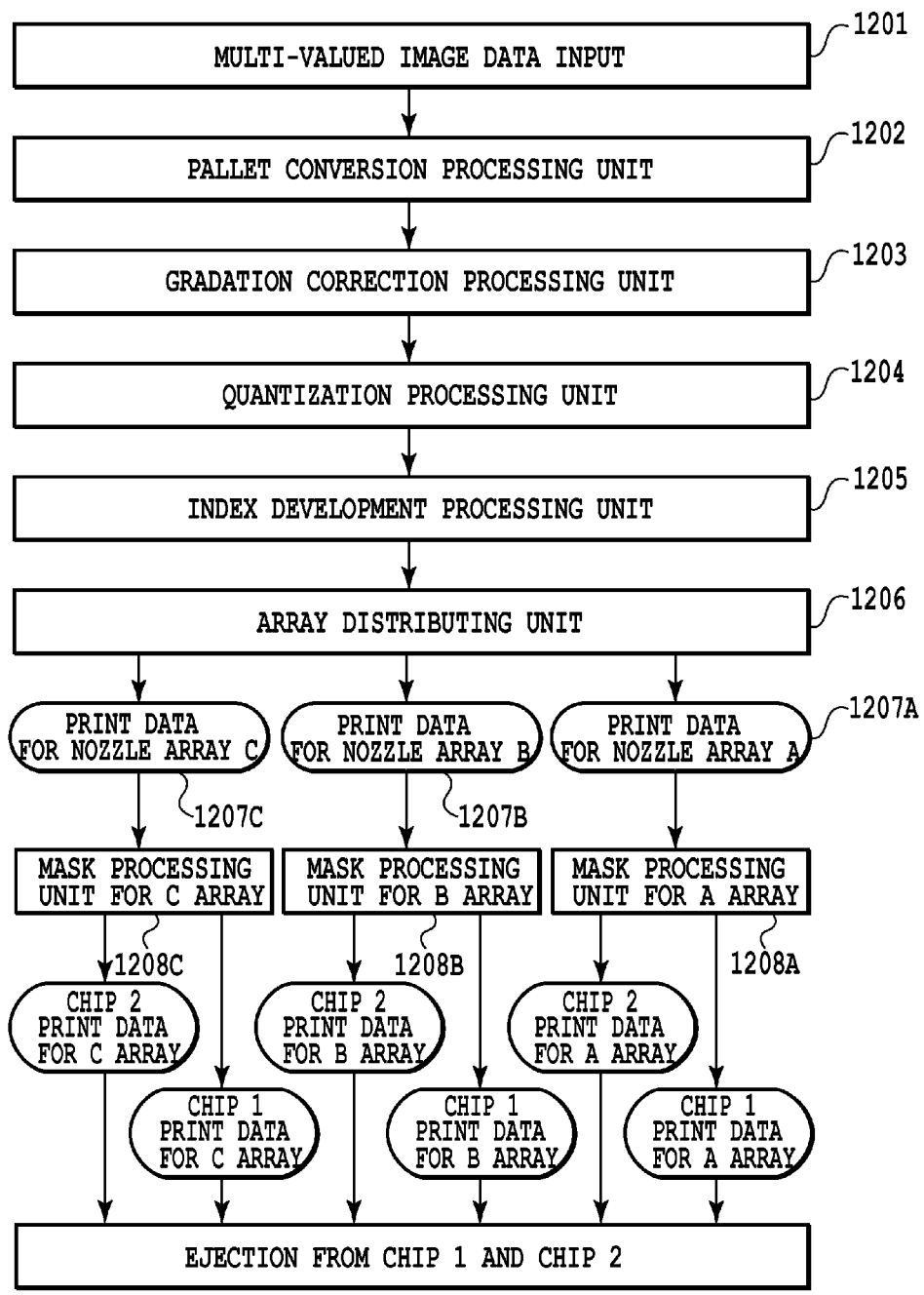
FIG. 10 is a block diagram showing image processing in a case of printing dots using the connecting head with three nozzle arrays.
Figure 11A:
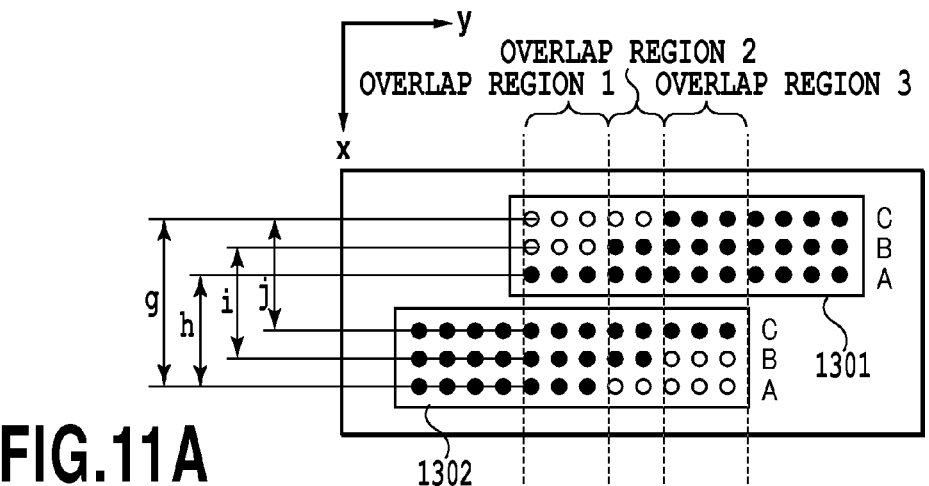
FIGS. 11A to 11D are diagrams explaining a use state of nozzles in the vicinity of the overlap region.
Figure 11B:
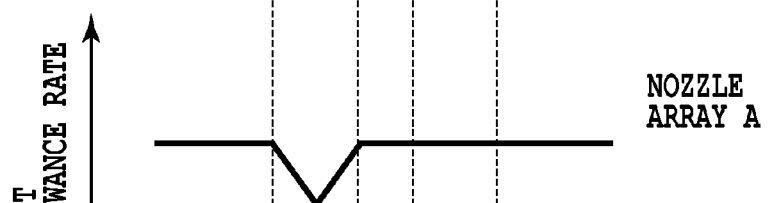
Figure 11C:
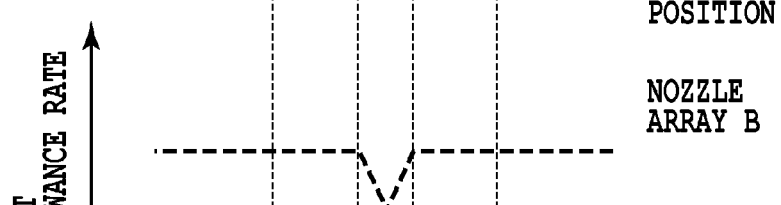
Figure 11D:
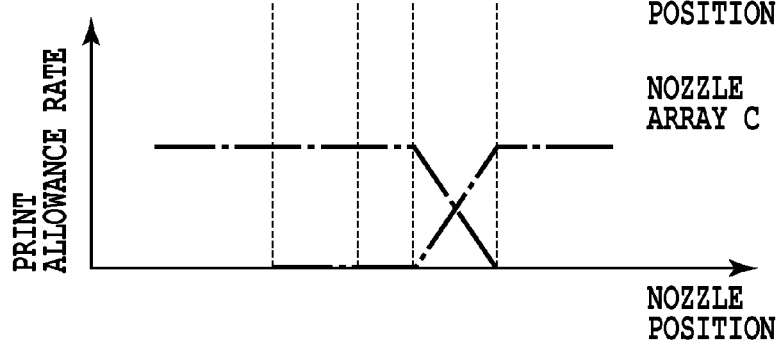

FIG. 10 is a block diagram explaining the process of image processing in a case of printing using the connecting head having three nozzle arrays on one chip. Since the processing until the index development processing unit 1205 is the same as in the first embodiment shown in FIG. 6, an explanation thereof is eliminated.

In an array distributing unit 1206 of the present modification, the binary data of each color is distributed to any of nozzle array A, nozzle array B and nozzle C provided in each chip. As a result, the individual binary data is distributed to a binary data 1207A for nozzle array A printed by nozzle array A, a binary data 1207B for nozzle array B printed by nozzle array B and a binary data 1207C for nozzle array C printed by nozzle array C.

Further, mask processing 1208A for nozzle array A is performed to the binary data 1207A for nozzle array A, which is divided into data corresponding to a plurality of chips arranged on the print head. In addition, mask processing 1208B for nozzle array B is performed to the binary data 1207B for nozzle array B, which is divided into data corresponding to a plurality of chips arranged on the print head. Further, mask processing 1208C for nozzle array C is performed to the binary data 1207C for nozzle array C, which is divided into data corresponding to a plurality of chips arranged on the print head.

When a series of the processing as explained above is completed, an actual ejection operation is performed according to the binary data corresponding to each chip and each nozzle array.

FIGS. 11A to 11D are diagrams explaining another example of a use state of individual nozzles in the vicinity of the overlap region in the present embodiment in the same way as In FIGS. 7A to 7C.

In the present modification, the overlap region corresponding to eight nozzles is divided into overlap region 1 corresponding to three nozzles and overlap region 2 corresponding to two nozzles and overlap region 3 corresponding to three nozzles, to each of which different processing is performed. In overlap region 1, dots are not printed by nozzle array B and nozzle array C of the chip 1301 and dots are printed by four arrays of nozzle arrays A to C of the chip 1302 and nozzle array A of the chip 1301.

In overlap region 2, dots are not printed by nozzle array C of the chip 1301 and nozzle array A of the chip 1302 and dots are printed by four arrays of nozzle array A and nozzle array B of the chip 1301 and nozzle array B and nozzle array C of the chip 1302.

In overlap region 3, dots are not printed by nozzle array A and nozzle array B of the chip 1302 and dots are printed at four arrays of nozzle arrays A to C of the chip 1301 and nozzle array C of the chip 1302.

In a case of performing the above print, in overlap region 1, a width in x direction of nozzle arrays used for the printing corresponds to a distance h between nozzle array A in the chip 1301 to nozzle array A in the chip 1302. In addition, in overlap region 2, a width in x direction of nozzle arrays used for the printing corresponds to a distance i between nozzle array B in the chip 1301 and nozzle array B in the chip 1302. Further, in overlap region 3, a width in x direction of nozzle arrays used for the printing corresponds to a distance j between nozzle array C in the chip 1301 and nozzle array C in the chip 1302. Any of the distances h, i and j is smaller than a width in x direction of six nozzle arrays, that is, a distance g between nozzle array C in the chip 1301 and nozzle array A in the chip 1302. Therefore, even if the inclination of the conveyance of the print medium occurs as explained in FIG. 2B, a distance between two separated dots is expressed in a formula of $c = h \times \tan\theta (i \times \tan\theta, j \times \tan\theta) < g \times \tan\theta$, and the print position shift can be restricted to be smaller than in a case of using all the six nozzle arrays.

According to the present modification, in a case of using the chip having three nozzle arrays, by dividing the region, in which the print allowance rate changes, into plural regions, both of the two nozzle arrays positioned at the outermost side in the conveyance direction are not used in at least one of the plural regions. Therefore, even in a case where the conveyance direction of the print medium is inclined, the print position shift between dots can be restricted to prevent a density change or graininess from standing out in at least apart of the overlap region. Particularly, if the print data, in all the regions where the print allowance rate changes, is distributed to the nozzle arrays such that at least one of the nozzle arrays positioned in the outermost side in the conveyance direction among a plurality of nozzle arrays is not used for printing, the effect of preventing the density change or the graininess from standing out is further enhanced.

Second Embodiment

Figure 12:
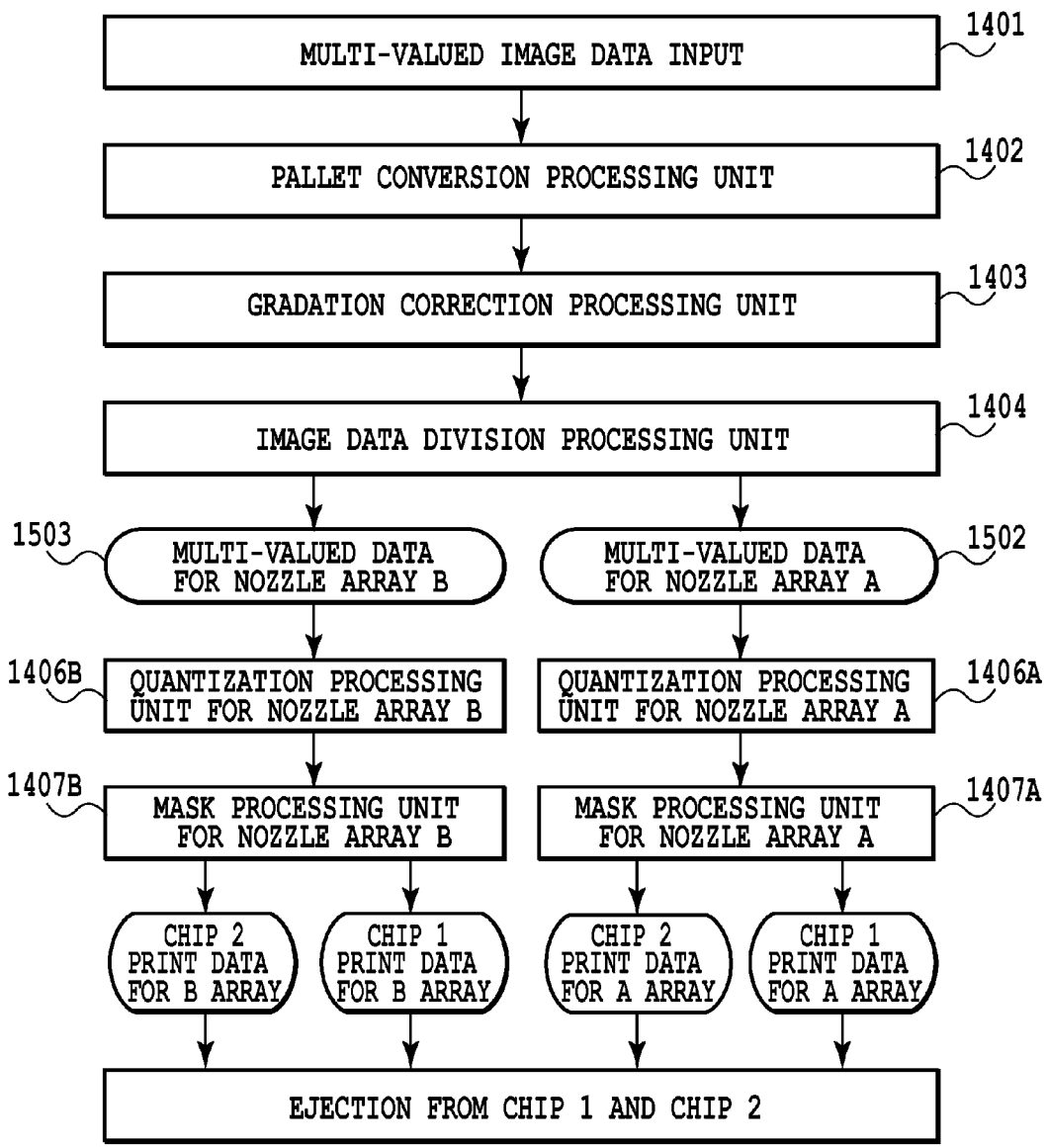
FIG. 12 is a block diagram explaining the process of image processing in a second embodiment.

The second embodiment has an object of further enhancing an image quality by using the processing method disclosed in Japanese Patent Laid-Open No. 2000-103088 or Japanese Patent Laid-Open No. 2001-150700 together, in addition to the effect explained in the first embodiment. FIG. 12 is a block diagram explaining the process of image processing in the second embodiment in a case of printing dots using the connecting heads 101 to 104. Since the processing until the gradation correction processing unit 1403 is the same as in the first embodiment shown in FIG. 6, an explanation thereof is eliminated.

In the present embodiment, in an image data dividing unit 1404, multi-valued data of each color received from the gradation correction processing unit 1403 are distributed to nozzle array A and nozzle array B as the multi-valued data are. Thereafter, quantization processing 1406A for nozzle array A is performed to the multi-valued data for nozzle array A 1502 to generate binary data for nozzle array A. In addition, quantization processing 1406B for nozzle array B is performed to the multi-valued data for nozzle array B 1503 to generate binary data for nozzle array B.

Figure 13:
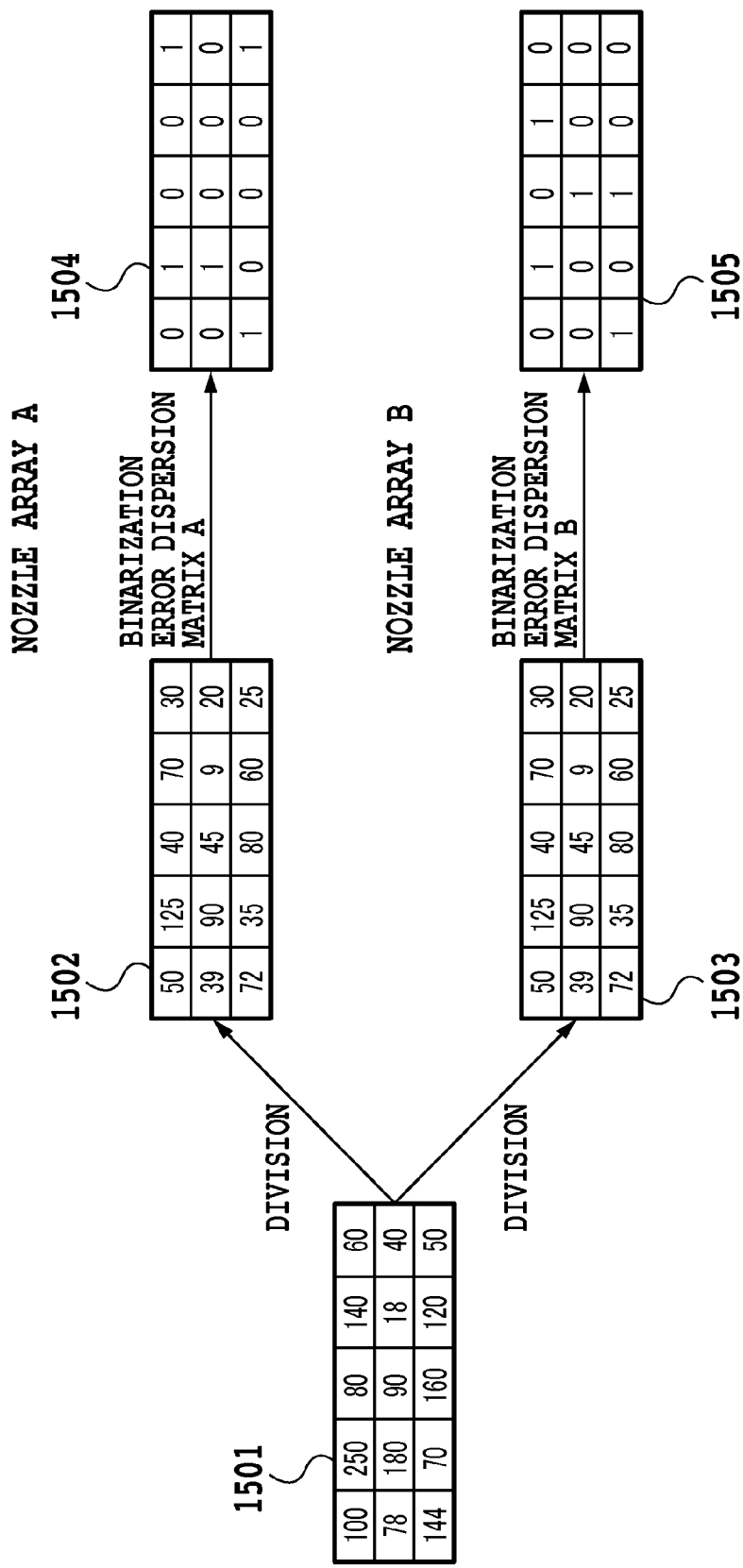
FIG. 13 is a diagram explaining the processing of an image data dividing unit and a quantization processing unit.

FIG. 13 is a diagram explaining a multi-valued data dividing method in the image data dividing unit 104 and a state of binary data generating processing in the quantization processing units 1406A and 1406B. Data 1501 inputted from the gradation correction processing unit 1403 are multi-valued data expressed in a range of 0 to 255 in regard to each pixel. The image data dividing unit 1404 divides this value into two data for each pixel (multiplying this value by a coefficient of 0.5) to generate a multi-valued data 1502 for nozzle array A and a multi-valued data 1503 for nozzle array B. Thereafter, in each of the quantization processing units, the binarization processing is performed using an error diffusion method to the multi-valued data divided into the two data to binarize each pixel for providing print (0) or non-print (0).

At this time, when an error distribution matrix used in the error diffusion processing for nozzle array A is different form that used in the error diffusion processing for nozzle array B, the result after the binarization can be made to be different therebetween. For example, in the quantization processing unit 1406A for nozzle array A, a binary data for nozzle array A is obtained by using the error distribution matrix shown in FIG. 14A from the multi-valued data 1502 for nozzle array A. In addition, in the quantization processing unit 1406B for nozzle array B, a binary data for nozzle array B is obtained by using the error distribution matrix shown in FIG. 14B from the multi-valued data 1503 for nozzle array B. As a result, by comparing the binary data for nozzle array A with the binary data for nozzle array B, there exists a pixel having print (1) in either one of nozzle array A and nozzle array B and there exists a pixel having print (1) in both of nozzle array A and nozzle array B. That is, when the above image processing is performed, dots can be arranged in such a manner that the binary data for nozzle array A has no complementary relation with the binary data for nozzle array B.

Figure 15A:
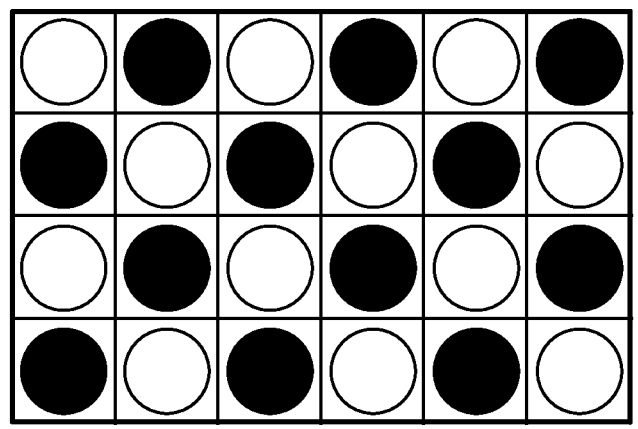
FIG. 15A and FIG. 15B are diagrams explaining an effect caused by having no complementary relation between two dot groups.
Figure 15B:
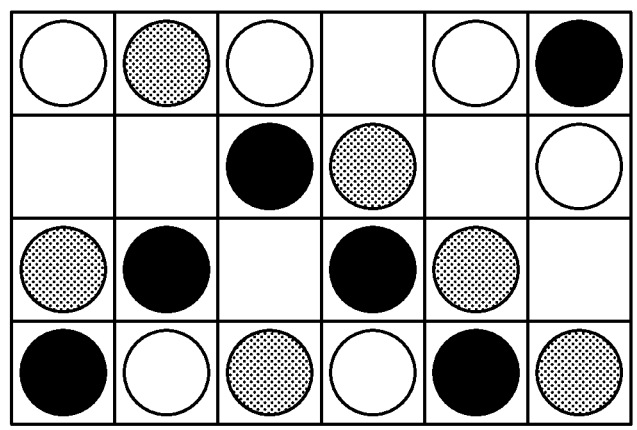

FIGS. 15A and 15B are diagrams explaining an advantage due to producing no complementary relation between two dot groups. FIG. 15A shows a state where dots (black circles) printed by nozzle array A and dots (white circles) printed by nozzle array B are complementary. In this case, when the print position of nozzle array A and the print position of nozzle array B are relatively shifted only by one pixel in any of right, left, upper and lower directions, the black circle and the white circle completely overlap and therefore a white sheet region is exposed. That is, according to the printing method having the complementary relation as in the case of FIG. 15A, an image quality is easily affected by a slight print position shift due to an error of the printer.

On the other hand, FIG. 15B shows a state where dots printed by nozzle array A and dots printed by nozzle array B have no complementary relation with each other. In the figure, the black circle shows the dot printed by nozzle array A, the white circle shows the dot printed by nozzle array B and the gray circle shows the dot printed to be overlapped by nozzle array A and nozzle array B. According to this arrangement, even when the dot group printed by nozzle array A and the dot group printed by nozzle array B are shifted in any of right, left, upper and lower directions, a coverage rate of the dot on the print medium does not change so much. This is because there newly occurs a portion where the dot printed by nozzle array A and the dot printed by nozzle array B overlap, but there exists a portion where two dots which should be originally printed to overlap do not overlap. In this way, when the processing of producing no complementary relation between the dot printed by nozzle array A and the dot printed by nozzle array B is performed, even if the print position shift occurs between nozzle array A and nozzle array B, the density variation can be restricted.

It should be noted that the method of dividing the data at a stage of the multi-valued data, which will be binarized later by a different process and the effect according to the method are disclosed in Japanese Patent Laid-Open No. 2000-103088 or Japanese Patent Laid-Open No. 2001-150700. The present embodiment is configured in such a manner that by adding the construction of Japanese Patent Laid-Open No. H05-057965 (1993) or Japanese Patent Laid-Open No. 2001-150700 to the featuring constriction of the present invention, the functions and effects of both can be achieved together.

Again, by referring to FIG. 12, mask processing 1407A for nozzle array A is performed to the binary data for nozzle array A after quantization processing, which is divided into data corresponding to a plurality of chips arranged on the print head. In addition, mask processing 1407B for nozzle array B is performed to the binary data for nozzle array B, which is divided into data corresponding to a plurality of chips arranged on the print head. In regard to a distributing method (dividing method) of the print data to two chips in the overlap region, when the method of the first embodiment already explained using FIGS. 7A to 7C or FIGS. 8A to 8C are adopted, the similar effect can be obtained. On the other hand, since the present embodiment is designed to have no complementary relation between the print positions of the nozzle arrays in each chip, the density variation or the graininess due to the print position shift between the nozzle arrays is restricted. As a result, even in a case where the inclination is contained in the conveyance direction of the print medium, or even in a case where the print position shift occurs between the nozzle arrays, the adverse effect due to this event can be restricted to prevent the density change or the graininess from standing out.

Modification 1 of Second Embodiment

Figure 16:
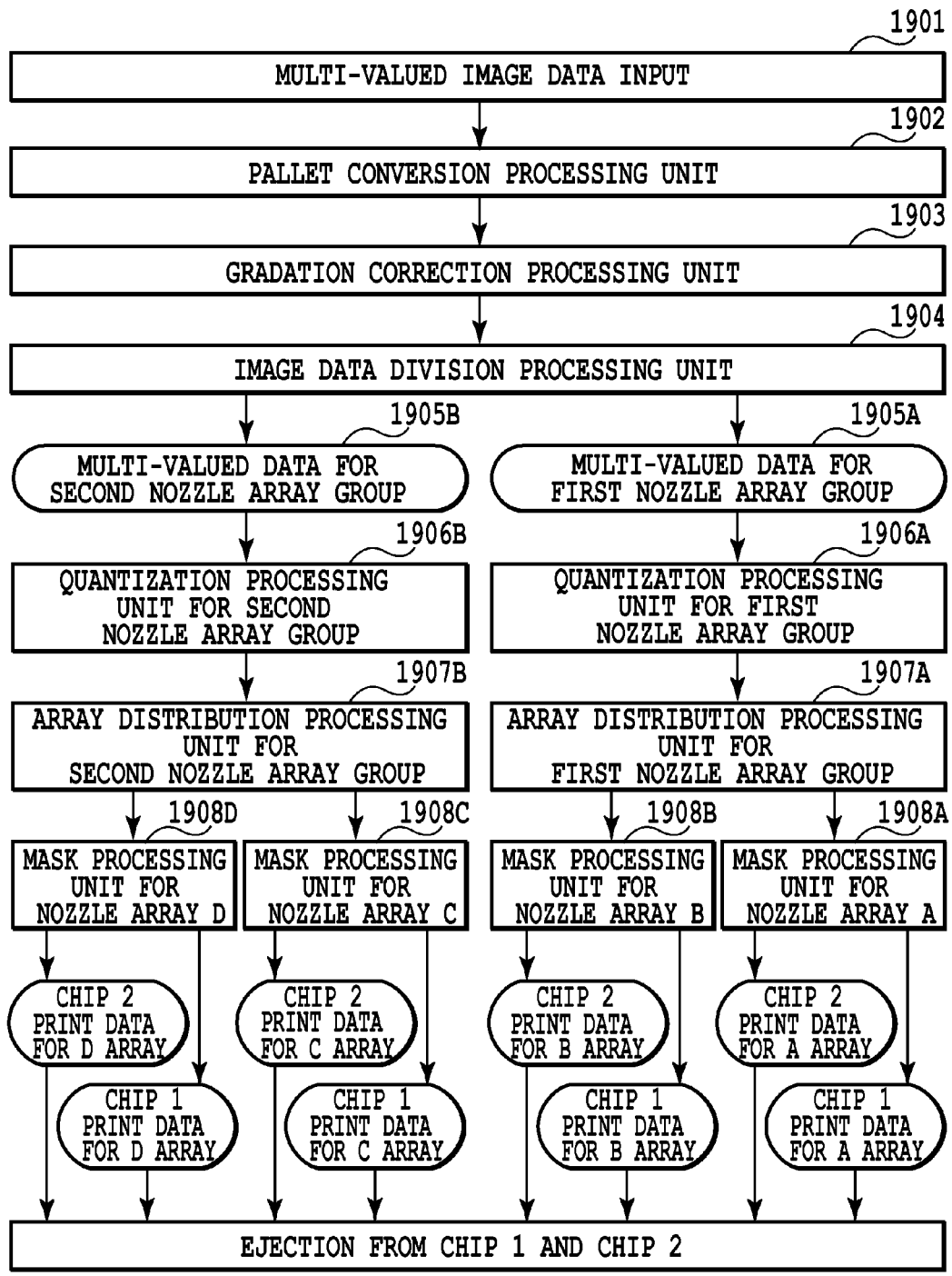
FIG. 16 is a block diagram showing image processing in a case of using the connecting head with four nozzle arrays.

FIG. 16 is a block diagram explaining the process of image processing in the present modification in a case of printing by using the connecting head having four nozzle arrays on one chip as shown in FIG. 17A. Since the processing until gradation correction processing unit 1903 is the same as in the second embodiment shown in FIG. 12, an explanation thereof is eliminated.

In the present modification, in an image data dividing unit 1904, multi-valued data of each color received from the gradation correction processing unit 1903 are distributed to multi-valued data 1905A for a first nozzle array group and multi-valued data 1905B for a second nozzle array group as the multi-valued data are. By referring to FIG. 17A, in the present modification the first nozzle array group includes nozzle array A and nozzle array B among four nozzle arrays. In addition, the second nozzle array group includes nozzle array C and nozzle array D among the four nozzle arrays.

Thereafter, quantization processing 1906A for the first nozzle array group is performed to the multi-valued data 1905A for the first nozzle array group, which is converted into a binary data for the first nozzle array group. Quantization processing 1906B for the second nozzle array group is performed to the multi-valued data 1905B for the second nozzle array group, which is converted into a binary data for the second nozzle array group. The binary data for the first nozzle array group thus generated is distributed to a binary data for nozzle array A and a binary data for nozzle array B by an array distribution processing 1907A for the first nozzle array group. Further, the binary data for the second nozzle array group is distributed to a binary data for nozzle array C and a binary data for nozzle array D by an array distribution processing 1907B for the second nozzle array group.

Further, mask processing 1908A for nozzle array A is performed to the binary data for nozzle array A, which is divided into a plurality of chips arranged on the print head. Mask processing 1908B for nozzle array B is performed to the binary data for nozzle array B, which is divided into a plurality of chips arranged on the print head. Mask processing 1908C for nozzle array C is performed to the binary data for nozzle array C, which is divided into a plurality of chips arranged on the print head. Mask processing 1908D for nozzle array D is performed to the binary data for nozzle array D, which is divided into a plurality of chips arranged on the print head. When a series of the processing as explained above is completed, an actual ejection operation is performed according to the binary data corresponding to each chip and each nozzle array.

FIGS. 17A to 17E are diagrams explaining a use state of individual nozzles in the vicinity of the overlap region in the present modification. In FIG. 17A, in individual nozzles arranged in the two chips 2101 and 2102, the nozzle used for the printing is shown in a black circle and the nozzle not used for the printing is shown in a white circle. FIG. 17B shows a print allowance rate corresponding to a nozzle position of each of the chip 2101 and the chip 2102 in nozzle array A. In addition, FIG. 17C shows a print allowance rate corresponding to a nozzle position of each of the chip 2101 and the chip 2102 in nozzle array B and FIG. 17D shows a print allowance rate corresponding to a nozzle position of each of the chip 2101 and the chip 2102 in nozzle array C. FIG. 17E shows a print allowance rate corresponding to a nozzle position of each of the chip 2101 and the chip 2102 in nozzle array D. It should be noted that the nozzle having the print allowance rate of 0% is shown in a white circle in FIG. 17A.

In the present modification, the overlap region corresponding to eight nozzles is divided into overlap regions 1 to 4 each having two nozzles, to each of which different processing is performed. In overlap region 1, dots are not printed by nozzle arrays B to D of the chip 2101 and dots are printed by five arrays of nozzle arrays A to D of the chip 2102 and nozzle array A of the chip 2101. In this region, each print allowance rate of nozzle arrays B to D of the chip 2102 is 25% without variations. The print allowance rate of nozzle array A in the chip 2101 and the print allowance rate of the nozzle array A in the chip 2102, as shown in FIG. 17B, change depending on the position, and the two print allowance rates are combined to become 25% without variations. That is, in overlap region 1, a sum of the print allowance rates of nozzle array A in the chip 2101 and nozzle arrays A to D in the chip 2102 amounts to 100%.

In overlap region 2, dots are not printed by nozzle array A of the chip 2102 and nozzle array C and nozzle array D of the chip 2101 and dots are printed by five arrays of nozzle arrays B to D of the chip 2102 and nozzle arrays A and B of the chip 2101. In overlap region 3, dots are not printed by nozzle arrays A and B of the chip 2102 and nozzle array D of the chip 2101 and dots are printed by five arrays of nozzle arrays A to C of the chip 2101 and nozzle arrays C and D of the chip 2102. In overlap region 4, dots are not printed by nozzle arrays A to C of the chip 2102 and dots are printed by five arrays of nozzle arrays A to D of the chip 2101 and nozzle array D of the chip 2102. In the present modification, the array distribution processing or the mask processing is performed to satisfy the above relation and the print allowance rates in FIGS. 17B to 17D.

In a case of printing dots at the print allowance rate as described above, in overlap region 1, a width in x direction of nozzle arrays used for the printing corresponds to a distance l between nozzle array A in the chip 2101 and nozzle array A in the chip 2102. In addition, in overlap region 2, a width in x direction of nozzle arrays used for the printing corresponds to a distance m between nozzle array B in the chip 2101 and nozzle array B in the chip 2102. In overlap region 3, a width in x direction of nozzle arrays used for the printing corresponds to a distance n between nozzle array C in the chip 2101 and nozzle array C in the chip 2102. In addition, in overlap region 4, a width in x direction of nozzle arrays used for the printing corresponds to a distance o between nozzle array D in the chip 2101 to nozzle array D in the chip 2102. Any of the distances l, m, n and o is smaller than a width of eight nozzle arrays in x direction, that is, a distance k in x direction from nozzle array D in the chip 2101 to nozzle array A in the chip 2102. Therefore, even if the inclination of the conveyance of the print medium occurs as explained in FIG. 2B, a distance between two separated dots is expressed in a formula of $c=l \times \tan \theta < k \times \tan \theta (l \approx m \approx n \approx o)$, and the print position shift is restricted to be smaller than in a case of using all the eight nozzle arrays.

According to the present modification, in a case of using the chip having three or more nozzle arrays, by dividing the region in which the print allowance rate changes into plural regions, both of the two nozzle arrays positioned at the outermost side in the conveyance direction are not used in at least one of the regions. Further, the print data, in all the regions where the print allowance rate changes, is distributed such that at least one of the nozzle arrays positioned in the outermost side in the conveyance direction among a plurality of nozzle arrays is not used for printing. In addition to the above construction, since the present embodiment is designed to have no complementary relation between the print positions of the nozzle arrays in each chip, the density variation or the graininess due to the print position shift between the nozzle arrays is prevented from standing out in the same way as in Japanese Patent Laid-Open NO. 2000-103088 or Japanese Patent Laid-Open No. 2001-150700. As a result, even in a case where the inclination is contained in the conveyance direction of the print medium, or even in a case where the print position shift occurs between the nozzle arrays respectively, the print position shift between dots can be restricted to prevent the density change or the graininess from standing out.

Modification 2 of Second Embodiment

Figure 18:
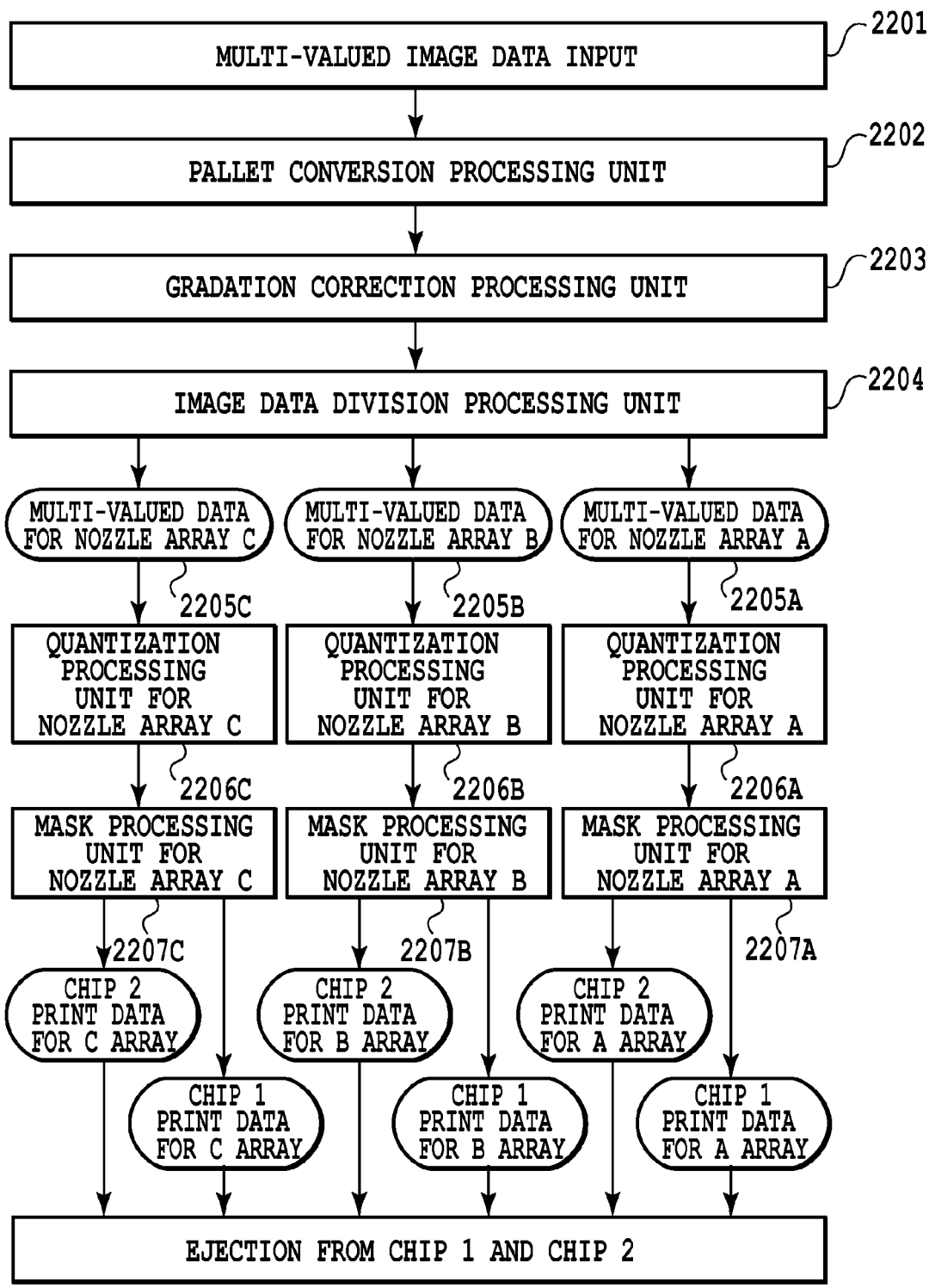
FIG. 18 is a block diagram showing image processing in a case of printing dots using the connecting head with three nozzle arrays.

FIG. 18 is a block diagram explaining the process of image processing in the present modification in a case of printing dots by using the connecting head having three nozzle arrays on one chip. Since the processing until gradation correction processing unit 2203 is the same as in the second embodiment shown in FIG. 12, an explanation thereof is eliminated.

In an image data dividing unit 2204 of the present modification, multi-valued data of each color received from the gradation correction processing unit 2203 are divided into three data of multi-valued data 2205A for nozzle array A, multi-valued data 2205B for nozzle array B and multi-valued data 2205C for nozzle array C as the multi-valued data are. Thereafter, quantization processing 2206A for the nozzle array A is performed to the multi-valued data 2205A for the nozzle array A, which is converted into a binary data for the nozzle array A. Quantization processing 2206B for the nozzle array B is performed to the multi-valued data 2205B for the nozzle array B, which is converted into a binary data for the nozzle array B. Further, quantization processing 2206C for the nozzle array C is performed to the multi-valued data 2205C for the nozzle array C, which is converted into a binary data for the nozzle array C.

The binary data for nozzle array A thus generated is divided into a plurality of chips arranged on the print head by mask processing unit 2207A for nozzle array A. The binary data for nozzle array B is divided into a plurality of chips arranged on the print head by mask processing unit 2207B for nozzle array B. In addition, the binary data for nozzle array C is divided into a plurality of chips arranged on the print head by mask processing unit 2207C for nozzle array C. In regard to a distributing method (dividing method) of the print data to two chips in the overlap region, by adopting the method already explained using FIGS. 11A to 11C, the effect similar to that of the above embodiment can be obtained. When a series of the processing as explained above is completed, an actual ejection operation is performed according to the binary data corresponding to each chip and each nozzle array.

According to the present modification, in the construction of thus using one chip having three or more nozzle arrays, the multi-valued data are divided to generate the multi-valued data corresponding to each of the plurality of the nozzle arrays, which are respectively quantized. On top of that, in the overlap region, the region where the print allowance rate changes is divided into plural regions, which are arranged to be shifted from each other. Further, the print data, in all the regions where the print allowance rate changes, is distributed to the plural nozzle arrays such that at least one of the nozzle arrays positioned in the outermost side in the conveyance direction among a plurality of nozzle arrays is not used for printing. As a result, even in a case where the inclination is contained in the conveyance direction of the print medium, or even in a case where the print position shift occurs between the nozzle arrays respectively, the position shift between dots can be restricted to prevent the density change or the graininess from standing out.

Third Embodiment

Figure 19:
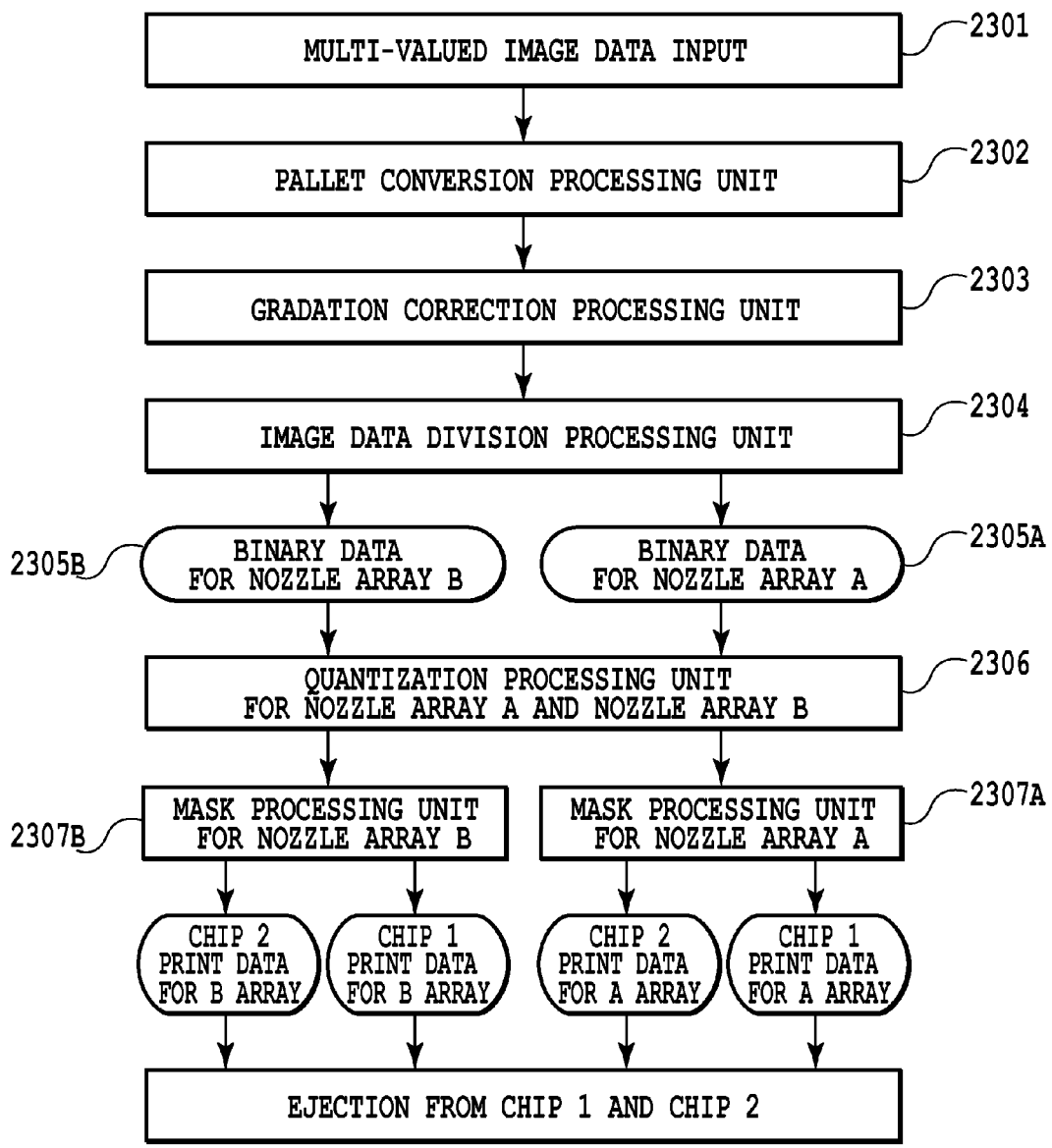
FIG. 19 is a block diagram showing image processing in a case of printing dots using the connecting head.

FIG. 19 is a block diagram explaining the process of image processing in the present embodiment in a case of printing dots using the connecting heads 101 to 104. Since the processing until image data division processing unit 2304 is the same as in the second embodiment shown in FIG. 12, an explanation thereof is eliminated. That is, in the present embodiment also, the image data is divided corresponding to a plurality of nozzle arrays (nozzle array A and nozzle array B herein) at a state of the multi-value. However, the present embodiment is characterized by the quantization processing at the time of quantizing the plurality of the generated multi-valued data.

In the present embodiment, at a quantization processing unit 2306 for nozzle array A and nozzle array B, a binary data for nozzle array A and a binary data for nozzle array B are generated based upon both of multi-valued data 2305 A for nozzle array A and multi-valued data 2305B for nozzle array B.

Figure 20:
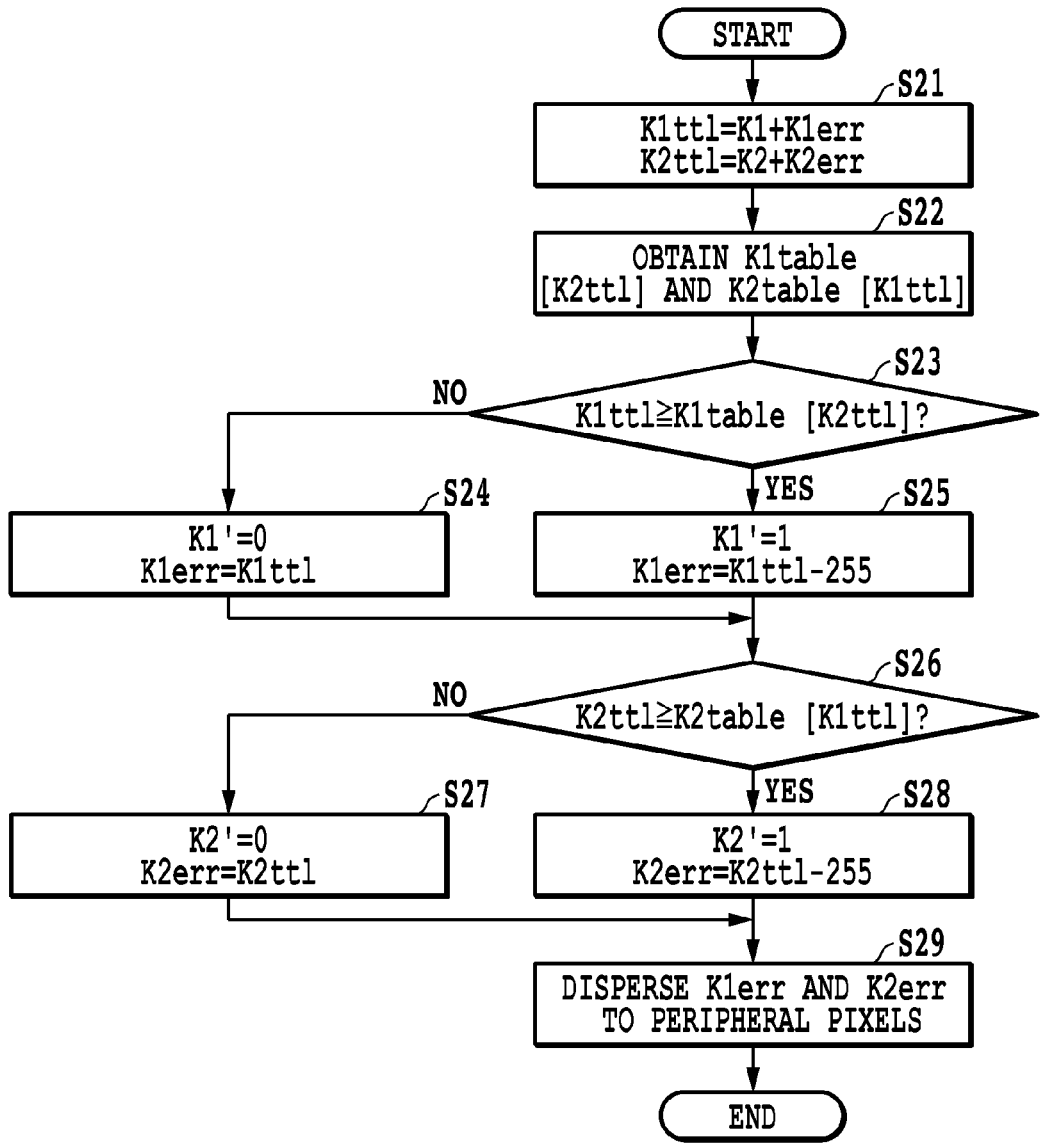
FIG. 20 is a flow chart explaining an example of a quantization processing process.

FIG. 20 is a flow chart explaining an example of the process order performed at the quantization processing unit 2306. In FIG. 20, two targets to be quantized, that is, two input multi-valued data K1 and K2 correspond to the multi-valued data 2305A for nozzle array A and the multi-valued data 2305B for nozzle array B, which have values of 0 to 255. In addition, K1err and K2err show accumulated error values generated from peripheral pixels to which the quantization processing is already completed, and each of K1*ttl* and K2*ttl* is a value as a sum of the input multi-valued data and the accumulated error value. Further, in the flow chart, K1' shows the binary data for nozzle array A and K2' shows the binary data for nozzle array B.

In the present processing, a threshold value (quantization parameter) used in determining a value of K1' or K2' as the binary quantization data differs depending on the value of K1*ttl* or K2*ttl*. Therefore, there is in advance prepared a table in which the threshold value is determined depending on the value of K1*ttl* or K2*ttl*. Herein the threshold value compared with K1*ttl* in determining K1' is defined as K1table [K2*ttl*] and the threshold value compared with K2*ttl* in determining K2' is defined as K2table [K1*ttl*]. K1table [K2*ttl*] is a value defined by a value of K2*ttl* and K2table [K1*ttl*] is a value defined by a value of K1*ttl*.

When the present processing is started, First at S21, the accumulated values K1err and K2err respectively are added to the input multi-valued data K1 and K2 to obtain K1*ttl* and K2*ttl*. Next, at S22, by referring to a threshold table as shown in the following Table 1, the two threshold values K1table [K2*ttl*] and K2table [K1*ttl*] are obtained from K1*ttl* and K2*ttl* found at S21. The threshold value K1table [K2*ttl*] is found using K2*ttl* as "a reference value" of the threshold value table in Table 1 shown as follows. The threshold value K2table [K1*ttl*] is found using K1*ttl* as "a reference value" of the threshold value table in Table 1.

Next, at S23 to at S25 a value of K1' is determined and at S26 to S28, a value of K2' is determined. Specifically at S23 it is determined whether or not K1*ttl* calculated at S21 is more than the threshold value K1table[K2*ttl*] obtained at S22. In a case where it is determined that K1*ttl* is more than the threshold value, K1'=1, and the accumulated error value K1err (=K1*ttl*−255) is calculated corresponding to this output value (K1'=1) to be updated (S25). On the other hand, in a case where it is determined that K1*ttl* is less than the threshold value, K1'=0, and the cumulative error value K1err (=K1*ttl*) is calculated corresponding to this output value (K1'=0) to be updated (S24).

Next, at S26 it is determined whether or not K2*ttl* calculated at S21 is more than the threshold value K2table[K1*ttl*] obtained at S22. In a case where it is determined that K2*ttl* is more than the threshold value, K2'=1, and the cumulative error value K2err (=K2*ttl*−255) is calculated corresponding to this output value (K1'=1) to be updated (S28). On the other hand, in a case where it is determined that K2*ttl* is less than the threshold value, K2'=0, and the cumulative error value K2err (=K2*ttl*) is calculated corresponding to this output value (K2'=0) to be updated (S27).

Thereafter, at S29 the accumulated error values K1err and K2err updated as described above are dispersed to peripheral pixels which are not yet quantized, according to the error distribution matrix shown in FIG. 14A or FIG. 14B. In the present embodiment, the error distribution matrix shown in FIG. 14A is used for distributing the accumulated error value K1err to the peripheral pixels and the error distribution matrix shown in FIG. 14B is used for distributing the accumulated error value K2err to the peripheral pixels.

In this way, in the present embodiment, the threshold value (quantization parameter) used for performing the quantization processing to the multi-valued data (K1*ttl*) for nozzle array A is determined based upon the multi-valued data (K2*ttl*) for nozzle array B. Likewise, the threshold value (quantization parameter) used for performing the quantization processing to the multi-valued data (K2*ttl*) for nozzle array B is determined based upon the multi-valued data (K1*ttl*) for nozzle array A. That is, based upon both of the multi-valued data corresponding to one of two nozzle arrays and the multi-valued data corresponding to the other nozzle array, both the quantization processing of the multi-valued data corresponding to the one nozzle array and the quantization processing of the multi-valued data corresponding to the other nozzle array are performed. In consequence, for example, a dot print adjustment in such a manner that on a pixel where a dot is printed by one of the nozzle arrays, a dot is not printed as much as possible by the other nozzle array or in reverse a dot is positively printed by the other nozzle array, can be made corresponding to a value of the multi-valued data (that is, gradation). That is, even if the visibility of the graininess or a magnitude of the density change changes depending on the gradation, these levels can be adjusted appropriately corresponding to the gradation of each.

Figure 21A:
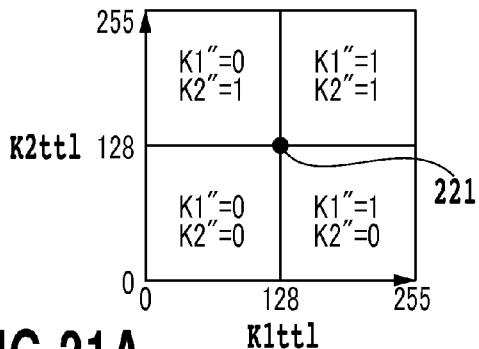
FIGS. 21A to 21G are diagrams showing a corresponding relation between a quantization result using a threshold value described in a threshold value table and an input value.

FIG. 21A is a diagram explaining a relationship of the result of performing quantization processing (binarization processing) and input values (K1*ttl* and K2*ttl*): the result being obtained according to the flow chart in FIG. 20 by using the threshold value described in a column in FIG. 21A in the threshold value table of the following Table 1. Each of K1*ttl* and K2*ttl* can be a value of 0 to 255, and print (1) and non-print (0) thereof are determined so as to have the threshold value of 128 as a boundary as shown in the column in FIG. 21A of the threshold value table. A point 221 in the figure is a boundary point between a region (K1'=0 and K2'=0) where a dot is not printed at all and a region (K1'=1 and K2'=1) where two dots are to be printed to overlap.

Figure 21B:
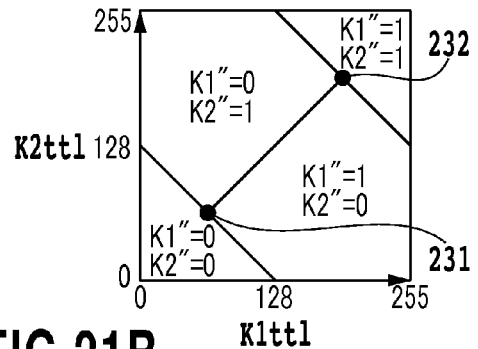

FIG. 21B is a diagram explaining a relationship of the result of performing quantization processing (binarization processing) and input values (K1*ttl* and K2*ttl*): the result being obtained according to the flow chart in FIG. 20 by using the threshold value described in a column in FIG. 21B in the threshold value table of the following Table 1. A point 231 in the figure is a boundary point between a region (K1'=0 and K2'=0) where a dot is not printed at all and a region (K1'=1 and K2'=0 or K1'=0 and K2'=1) where only one dot is printed. A point 232 in the figure is a boundary point between a region (K1'=1 and K2'=1) where two dots are printed to overlap and a region (K1'=1 and K2'=0 or K1'=0 and K2'=1) where only one dot is printed. Since the point 231 and the point 232 are located away on some degrees from each other, as compared to a case of FIG. 21A the region where the dot of either one is printed is increased and the region where the dots of both are printed is decreased. That is, in a case of FIG. 21B, a dot overlap rate (rate in which two dots are printed to overlap) is reduced to be smaller than in a case of FIG. 21A, which is advantageous in a point of restricting the graininess to be low. When a point where the dot overlap rate drastically changes as in the case of FIG. 21A exists, there possibly occurs a case where the density unevenness is generated due to a slight change of the gradation, but in a case of FIG. 21B, since the dot overlap rate smoothly changes in response to a change of the gradation, such density unevenness is difficult to be generated.

Hereinafter, several examples of threshold values for realizing different dot overlap rates will be explained with reference to FIGS. 21C to 21G. It should be noted that FIGS. 21C to 21G are diagrams each showing a corresponding relation between the result (K1' and K2') of performing quantization processing using the threshold value described in the threshold value table of the following Table 1 and input values (K1*ttl* and K2*ttl*) in the same way as in FIGS. 21A and 21B.

Figure 21C:
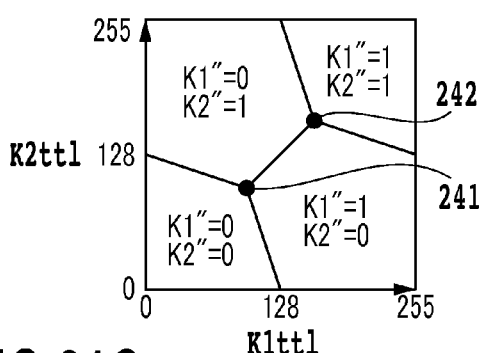

FIG. 21C is a diagram showing a case where the dot overlap rate is designed to be a value between FIG. 21A and FIG. 21B. A point 241 is defined in an intermediate point between the point 221 in FIG. 21A and the point 231 in FIG. 21B. In addition, a point 242 is defined in an intermediate point between the point 221 in FIG. 21A and the point 232 in FIG. 21B.

Figure 21D:
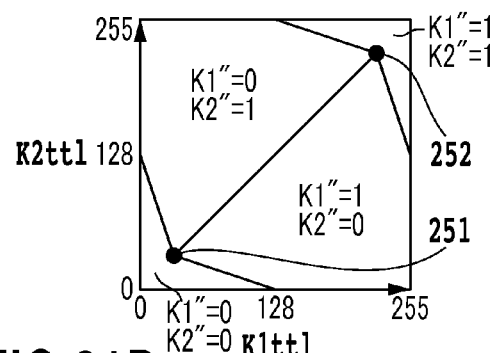

FIG. 21D shows a case where the dot overlap rate is further reduced than in a case of FIG. 21B. A point 251 is defined in a point externally dividing the point 221 in FIG. 21A and the point 231 in FIG. 21B in a ratio of three to two. In addition, a point 252 is defined in a point externally dividing the point 221 in FIG. 21A and the point 232 in FIG. 21B in a ratio of three to two.

Figure 21E:
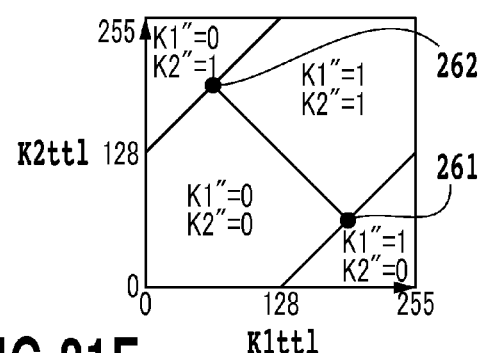
Figure 21F:
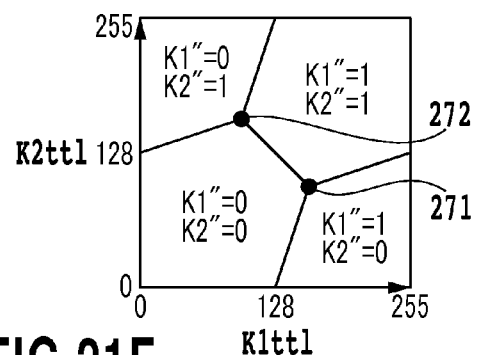
Figure 21G:
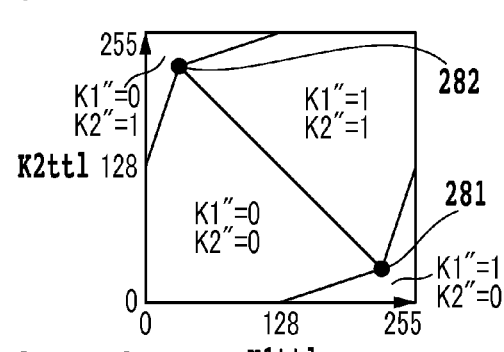

FIG. 21E shows a case where the dot overlap rate is increased more than in a case of FIG. 21A. According to FIG. 21E, there is more likely to occur a transition from the region (K1'=0 and K2'=0) where the dot is not printed at all to the region (K1'=1 and K2'=1) where two dots are printed to overlap, enabling the dot overlap rate to be increased. FIG. 21F is a diagram showing a case where the dot overlap rate is designed to be a value between FIG. 21A and FIG. 21E. FIG. 21G shows a case where the dot overlap rate is further increased than in a case of FIG. 21E.

Next, a method of quantization processing using the threshold value table shown in the following Table 1 will be specially explained. Table 1 is the threshold value table for obtaining threshold values at S 22 in the flow chart explained in FIG. 20 for realizing the processing result shown in FIGS. 21A to 21G.

Herein, there will be explained a case where the input values (K1*ttl* and K2*ttl*) are "110 and 120", and the threshold value described in the column of FIG. 21B in the threshold value table is used. First, at S22 in FIG. 20, the threshold value K1table [K2*ttl*] is found based upon the threshold value table shown in Table 1 and K2*ttl* (reference value). When the reference value (K2*ttl*) is "120", the threshold value K1table [K2*ttl*] is "120". Likewise, the threshold value K2table [K1*ttl*] is found based upon the threshold value table and K1*ttl* (reference value). When the reference value (K1*ttl*) is "100", the threshold value K2table [K1*ttl*] is "101". Next, at S23 in FIG. 20, K1*ttl* is compared with the threshold value K1table [K2*ttl*] for determination. In this case, since K1*ttl* (=100)<the threshold value K1table [K2*ttl*] (=120), K1'=0 (S24). Likewise, at S26 in FIG. 20, K2*ttl* is compared with the threshold value K2table [K1*ttl*] for determination. In this case, since K2*ttl* (=120)≥the threshold value K2table [K1*ttl*] (=101), K2'=1 (S28). As a result, as shown in FIG. 21B, in a case where "K1*ttl* and K2*ttl*"="100 and 120", "K1' and K2'"="0 and 1".

According to the quantization processing as described above, the dot overlap rate between two nozzle arrays is controlled by quantizing the multi-valued data for nozzle array A and the multi-valued data for nozzle array B based upon both of the multi-valued data for nozzle array A and the multi-valued data for nozzle array B. Therefore, it is possible to control the overlap rate between the dot printed by one of the nozzle arrays and the dot printed by the other nozzle array to be in a preferable range corresponding to the gradation. That is, by adjusting the dot overlap rate corresponding to the gradation, it is possible to avoid any of the density unevenness, the graininess and the density lack due to the print position shift between nozzle arrays in all the density regions.

It should be noted that in Table 1, the reference values are shown at intervals of three values, but in an actual table, threshold values (for example, 1 to 3) are prepared also between these values. However, in regard to the reference value, non-sequential numbers are prepared as shown in Table 1, and conversion of the other values may be found by interpolation processing from the nearby reference value.

TABLE 1

| | FIG. 21A | | FIG. 21B | | FIG. 21C | | FIG. 21D | | FIG. 21E | | FIG. 21F | | FIG. 21G | |
|---|---|---|---|---|---|---|---|---|---|---|---|---|---|---|
| REFERANCE VALUE | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 4 | 128 | 128 | 124 | 124 | 126 | 126 | 116 | 116 | 131 | 131 | 129 | 129 | 139 | 139 |

TABLE 1-continued

| | FIG. 21A | | FIG. 21B | | FIG. 21C | | FIG. 21D | | FIG. 21E | | FIG. 21F | | FIG. 21G | |
|---|---|---|---|---|---|---|---|---|---|---|---|---|---|---|
| REFERANCE VALUE | K1 table | K2 table | K1 table | K2 table | K1 table | K2 table | K1 table | K2 table | K1 table | K2 table | K1 table | K2 table | K1 table | K2 table |
| 8 | 128 | 128 | 120 | 120 | 125 | 125 | 104 | 104 | 135 | 135 | 130 | 130 | 151 | 151 |
| 12 | 128 | 128 | 116 | 116 | 124 | 124 | 92 | 92 | 139 | 139 | 131 | 131 | 163 | 163 |
| 16 | 128 | 128 | 112 | 112 | 122 | 122 | 80 | 80 | 143 | 143 | 133 | 133 | 175 | 175 |
| 20 | 128 | 128 | 108 | 108 | 121 | 121 | 68 | 68 | 147 | 147 | 134 | 134 | 187 | 187 |
| 24 | 128 | 128 | 104 | 104 | 120 | 120 | 56 | 56 | 151 | 151 | 135 | 135 | 199 | 199 |
| 28 | 128 | 128 | 100 | 100 | 118 | 118 | 44 | 44 | 155 | 155 | 137 | 137 | 211 | 211 |
| 32 | 128 | 128 | 96 | 96 | 117 | 117 | 32 | 33 | 159 | 159 | 138 | 138 | 223 | 222 |
| 36 | 128 | 128 | 92 | 92 | 116 | 116 | 36 | 37 | 163 | 163 | 139 | 139 | 219 | 218 |
| 40 | 128 | 128 | 88 | 88 | 114 | 114 | 40 | 41 | 167 | 167 | 141 | 141 | 215 | 214 |
| 44 | 128 | 128 | 84 | 84 | 113 | 113 | 44 | 45 | 171 | 171 | 142 | 142 | 211 | 210 |
| 48 | 128 | 128 | 80 | 80 | 112 | 112 | 48 | 49 | 175 | 175 | 143 | 143 | 207 | 206 |
| 52 | 128 | 128 | 76 | 76 | 110 | 110 | 52 | 53 | 179 | 179 | 145 | 145 | 203 | 202 |
| 56 | 128 | 128 | 72 | 72 | 109 | 109 | 56 | 57 | 183 | 183 | 146 | 146 | 199 | 198 |
| 60 | 128 | 128 | 68 | 68 | 108 | 108 | 60 | 61 | 187 | 187 | 147 | 147 | 195 | 194 |
| 64 | 128 | 128 | 64 | 65 | 106 | 106 | 64 | 65 | 191 | 190 | 149 | 149 | 191 | 190 |
| 68 | 128 | 128 | 68 | 69 | 105 | 105 | 68 | 69 | 187 | 186 | 150 | 150 | 187 | 186 |
| 72 | 128 | 128 | 72 | 73 | 104 | 104 | 72 | 73 | 183 | 182 | 151 | 151 | 183 | 182 |
| 76 | 128 | 128 | 76 | 77 | 102 | 102 | 76 | 77 | 179 | 178 | 153 | 153 | 179 | 178 |
| 80 | 128 | 128 | 80 | 81 | 101 | 101 | 80 | 81 | 175 | 174 | 154 | 154 | 175 | 174 |
| 84 | 128 | 128 | 84 | 85 | 100 | 100 | 84 | 85 | 171 | 170 | 155 | 155 | 171 | 170 |
| 88 | 128 | 128 | 88 | 89 | 98 | 98 | 88 | 89 | 167 | 166 | 157 | 157 | 167 | 166 |
| 92 | 128 | 128 | 92 | 93 | 97 | 97 | 92 | 93 | 163 | 162 | 158 | 158 | 163 | 162 |
| 96 | 128 | 128 | 96 | 97 | 96 | 97 | 96 | 97 | 159 | 158 | 159 | 158 | 159 | 158 |
| 100 | 128 | 128 | 100 | 101 | 100 | 101 | 100 | 101 | 155 | 154 | 155 | 154 | 155 | 154 |
| 104 | 128 | 128 | 104 | 105 | 104 | 105 | 104 | 105 | 151 | 150 | 151 | 150 | 151 | 150 |
| 108 | 128 | 128 | 108 | 109 | 108 | 109 | 108 | 109 | 147 | 146 | 147 | 146 | 147 | 146 |
| 112 | 128 | 128 | 112 | 113 | 112 | 113 | 112 | 113 | 143 | 142 | 143 | 142 | 143 | 142 |
| 116 | 128 | 128 | 116 | 117 | 116 | 117 | 116 | 117 | 139 | 138 | 139 | 138 | 139 | 138 |
| 120 | 128 | 128 | 120 | 121 | 120 | 121 | 120 | 121 | 135 | 134 | 135 | 134 | 135 | 134 |
| 124 | 128 | 128 | 124 | 125 | 124 | 125 | 124 | 125 | 131 | 130 | 131 | 130 | 131 | 130 |
| 128 | 128 | 128 | 128 | 129 | 128 | 129 | 128 | 129 | 127 | 126 | 127 | 126 | 127 | 126 |
| 132 | 128 | 128 | 132 | 133 | 132 | 133 | 132 | 133 | 123 | 122 | 123 | 122 | 123 | 122 |
| 136 | 128 | 128 | 136 | 137 | 136 | 137 | 136 | 137 | 119 | 118 | 119 | 118 | 119 | 118 |
| 140 | 128 | 128 | 140 | 141 | 140 | 141 | 140 | 141 | 115 | 114 | 115 | 114 | 115 | 114 |
| 144 | 128 | 128 | 144 | 145 | 144 | 145 | 144 | 145 | 111 | 110 | 111 | 110 | 111 | 110 |
| 148 | 128 | 128 | 148 | 149 | 148 | 149 | 148 | 149 | 107 | 106 | 107 | 106 | 107 | 106 |
| 152 | 128 | 128 | 152 | 153 | 152 | 153 | 152 | 153 | 103 | 102 | 103 | 102 | 103 | 102 |
| 156 | 128 | 128 | 156 | 157 | 156 | 157 | 156 | 157 | 99 | 98 | 99 | 98 | 99 | 98 |
| 160 | 128 | 128 | 160 | 161 | 157 | 158 | 160 | 161 | 95 | 94 | 97 | 97 | 94 | 95 |
| 164 | 128 | 128 | 164 | 165 | 159 | 159 | 164 | 165 | 91 | 90 | 96 | 96 | 91 | 90 |
| 168 | 128 | 128 | 168 | 169 | 157 | 157 | 168 | 169 | 87 | 86 | 98 | 98 | 87 | 86 |
| 172 | 128 | 128 | 172 | 173 | 156 | 156 | 172 | 173 | 83 | 82 | 99 | 99 | 83 | 82 |
| 176 | 128 | 128 | 176 | 177 | 155 | 155 | 176 | 177 | 79 | 78 | 100 | 100 | 79 | 78 |
| 180 | 128 | 128 | 180 | 181 | 153 | 153 | 180 | 181 | 75 | 74 | 102 | 102 | 75 | 74 |
| 184 | 128 | 128 | 184 | 185 | 152 | 152 | 184 | 185 | 71 | 70 | 103 | 103 | 71 | 70 |
| 188 | 128 | 128 | 188 | 189 | 151 | 151 | 188 | 189 | 67 | 66 | 104 | 104 | 67 | 66 |
| 192 | 128 | 128 | 191 | 191 | 149 | 149 | 192 | 193 | 64 | 64 | 106 | 106 | 63 | 62 |
| 196 | 128 | 128 | 187 | 187 | 148 | 148 | 196 | 197 | 68 | 68 | 107 | 107 | 59 | 58 |
| 200 | 128 | 128 | 183 | 183 | 147 | 147 | 200 | 201 | 72 | 72 | 108 | 108 | 55 | 54 |
| 204 | 128 | 128 | 179 | 179 | 145 | 145 | 204 | 205 | 76 | 76 | 110 | 110 | 51 | 50 |
| 208 | 128 | 128 | 175 | 175 | 144 | 144 | 208 | 209 | 80 | 80 | 111 | 111 | 47 | 46 |
| 212 | 128 | 128 | 171 | 171 | 143 | 143 | 212 | 213 | 84 | 84 | 112 | 112 | 43 | 42 |
| 216 | 128 | 128 | 167 | 167 | 141 | 141 | 216 | 217 | 88 | 88 | 114 | 114 | 39 | 38 |
| 220 | 128 | 128 | 163 | 163 | 140 | 140 | 220 | 221 | 92 | 92 | 115 | 115 | 35 | 34 |
| 224 | 128 | 128 | 159 | 159 | 139 | 139 | 222 | 222 | 96 | 96 | 116 | 116 | 33 | 33 |
| 228 | 128 | 128 | 155 | 155 | 137 | 137 | 210 | 210 | 100 | 100 | 118 | 118 | 45 | 45 |
| 232 | 128 | 128 | 151 | 151 | 136 | 136 | 198 | 198 | 104 | 104 | 119 | 119 | 57 | 57 |
| 236 | 128 | 128 | 147 | 147 | 135 | 135 | 186 | 186 | 108 | 108 | 120 | 120 | 69 | 69 |
| 240 | 128 | 128 | 143 | 143 | 133 | 133 | 174 | 174 | 112 | 112 | 122 | 122 | 81 | 81 |
| 244 | 128 | 128 | 139 | 139 | 132 | 132 | 162 | 162 | 116 | 116 | 123 | 123 | 93 | 93 |
| 248 | 128 | 128 | 135 | 135 | 131 | 131 | 150 | 150 | 120 | 120 | 124 | 124 | 105 | 105 |
| 252 | 128 | 128 | 131 | 131 | 129 | 129 | 138 | 138 | 124 | 124 | 126 | 126 | 117 | 117 |
| 255 | 128 | 128 | 128 | 128 | 129 | 129 | 129 | 129 | 127 | 127 | 126 | 126 | 126 | 126 |

Again, by referring back to FIG. 19, when a binary data for nozzle array A and a binary data for nozzle array B are generated by the quantization processing 2306, mask processing 2307A for nozzle array A is performed to the binary data for nozzle array A. A plurality of binary data corresponding to a plurality of chips arranged on the print head are generated. In addition, mask processing 2307B for nozzle array B is performed to the binary data for nozzle array B, and the binary data for nozzle array B is also divided into a plurality of chips arranged on the print head. In regard to a distributing method (dividing method) of the print data to two chips in the overlap region, by adopting the method of the first embodiment already explained using FIGS. 7A to 7C or FIGS. 8A to 8C, the effect similar to that of the first embodiment can be obtained.

On the other hand, the present embodiment is designed to have no complementary relation between the print positions of the nozzle arrays in each chip or control the dot overlap rate between nozzle arrays, thus preventing the density unevenness or the graininess due to the print position shift between the nozzle arrays from standing out. As a result, even in a case where the inclination is contained in the conveyance direction of the print medium, the print position shift between the dots can be restricted to prevent the density change or the graininess from standing out.

It should be noted that the present embodiment also is, in the same way as the second embodiment, applied to the construction provided with three or more nozzle arrays on one chip. For example, as in the case of modification 1 in the second embodiment, three or more nozzle arrays are classified into a first nozzle array group and a second nozzle array group and the multi-valued data is distributed to the two nozzle array groups. Thereafter, the quantization processing specific in the present embodiment may be performed thereto. In this case, a dot overlap rate between a dot group printed by nozzle arrays contained in the first nozzle array group and a dot group printed by nozzle arrays contained in the second nozzle array group can be controlled according to the method explained in FIG. 20 or FIGS. 21A to 21G.

As in the case of modification 2 in the second embodiment, it is possible that the multi-valued data is distributed corresponding to the three or more nozzle arrays, and thereafter, the quantization processing is performed to the multi-valued data of each of the three or more nozzle arrays based upon the three or more multi-valued data. In this case, a threshold value is set based upon each of the multi-valued data corresponding to M pieces (M≥three) of nozzle arrays to quantize each of the multi-valued data corresponding to M pieces of the nozzle arrays, thus generating M pieces of the quantization data. In a case of controlling the dot overlap rate explained in the third embodiment using M pieces of the nozzle arrays, the threshold value table is not a two-dimensional table shown in FIGS. 21A to 21G, but is an M-dimensional table having K1$ttl$ to KM$ttl$ as a coordinate axis.

Other Embodiment

The above embodiment has explained the construction of using ink of four colors of CMYK, but the kind number of usable ink colors is not limited to these numbers. In addition to the above four colors, light cyan (Lc) or light magenta ink (Lm) may be added, or special color ink such as red ink (R) or blue ink (B) may be added. On the contrary, the present invention is applicable to a mono-color mode in which a single-color ink is used. Further, the present invention is applicable to not only a color printer but also a monochromatic printer. In addition, other than the method in which the above control is performed to all of the plural kinds of ink (for example, ink of four colors of CMYK), the control of the above embodiment may be applied to at least two kinds of ink. The above embodiment is explained by taking the full line type printer using the connecting head as an example, but when the present invention adopts the connecting head, the present invention can be applied to a serial type printer.

The above embodiments have explained the content that the image processing until the quantization is performed by the host device 300 and the processing after that is performed by the printer 100, but the present invention is not limited to such a construction. So long as a series of the processing as described above is performed, any construction performed by any of the processing means, either hardware or software, is in the scope of the present invention. For example, the construction that all of the featuring image processing of the present invention are performed by the host device 300 or all of the processing are performed by the printer can be also within the scope of the present invention.

In addition, in the above embodiments, only the print allowance rates of the two nozzle arrays are designed to change in the region where the print allowance rate changes, but the print allowance rates of three or more nozzle arrays may change in the same region. Therefore, "the region where the print allowance rate changes" means a region where the print allowance rate in at least one nozzle array on each of two chips corresponding to the overlap region reduces toward the end portion in the chip (end portion in the nozzle array). In the above embodiment, by providing a plurality of such regions in the overlap region, it is possible to reduce the density change or degradation of the graininess even in a case where the conveyance error of the print medium occurs. Furthermore, "the region where the print allowance rate changes" of the present invention is not limited to "a region where the print allowance rate changes continuously". In other words, "the region where the print allowance rate changes" of the present invention involves "a region where the print allowance rate changes stepwisely".

The present invention can be also realized by program codes constituting computer readable programs for realizing the functions of the aforementioned image processing or by a printer storing the program code. In this case, the aforementioned image processing is realized by reading and performing the above program code by a computer (or CPU or MPU) of the host device or the image forming device. In this way, the computer readable program for making the computer perform the above image processing or the storage media storing the program is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-144303, filed Jun. 24, 2010, which is hereby incorporated by reference herein in its entirety.

What is claimed is:

1. An image processor for processing image data used in printing an image on a print medium using a print head provided with a first chip and a second chip, the first chip including a first nozzle array and a second nozzle array in each of which a plurality of nozzles for ejecting ink are arranged in a first direction, the second chip including a third nozzle array and a fourth nozzle array in each of which a plurality of nozzles for ejecting ink are arranged in the first direction, wherein the first, second, third and fourth nozzle arrays are arranged in order as the first, the second, the third and the fourth in a second direction intersecting the first direction, and an end of the first nozzle array and an end of the third nozzle array are overlapped and an end of the second nozzle array and an end of the fourth nozzle array are overlapped, the image processor comprising:

an assigning unit configured to assign image data corresponding to the overlap region to the nozzle arrays of the first chip and the second chip; and a supplying unit configured to supply the image data assigned by the assigning unit to the print head, wherein the assigning unit assigns image data corresponding to a first range of the overlap region, to nozzles of the first nozzle array, the second nozzle array and the third nozzle array, and does not assign the first image data to nozzles of the fourth nozzle array, wherein the assigning unit assigns second image data corresponding to a second range of the overlap region which does not overlap with the first range, to nozzles of the second nozzle array, third nozzle array and the fourth nozzle array, does not assign the second image data to nozzles of the first nozzle array, and wherein the assigning unit assigns third image data, corresponding to non-overlap region which is not the overlap region of the first chip, to nozzles of the first nozzle array and the second nozzle array and assigns the fourth image data, corresponding to non-overlap region which is not the overlap region of the second chip, to nozzles of the third nozzle array and the fourth nozzle array.

2. The image processor according to claim 1, further comprising:

a quantization unit configured to quantize image data of a multi-value to binary image data, wherein the assigning unit, by using a mask pattern defining a print allowance or a non-print allowance to each pixel, assigns the binary image data quantized by the quantization unit to the nozzle arrays on the first chip and second chip.

3. The image processor according to claim 1, further comprising:

a multi-valued data dividing unit configured to divide image data of a multi-value to generate a plurality of multi-valued data corresponding to the first, second, third and fourth nozzle arrays; and a binary data generating unit configured to generate a plurality of binary data corresponding to the first, second, third and fourth nozzle arrays by quantizing each of the plurality of multi-valued data obtaining by the multi-valued data dividing unit, wherein the assigning unit, by using a mask pattern defining a print allowance or a non-print allowance to each pixel, assigns the binary image data corresponding to the first, second, third and fourth nozzle arrays obtained by the binary data generating unit to the first, second, third and fourth nozzle arrays on the first chip and second chip.

4. The image processor according to claim 3, wherein the binary data generating unit quantizes each of the plurality of multi-valued data based upon the plurality of multi-valued data corresponding to the first, second, third and fourth nozzle arrays.

5. The image processor according to claim 1, wherein the assigning unit assigns the image data to the nozzle arrays in such a manner that, in each of the first chip and second chip, a print allowance rate of a nozzle positioned in an outermost end portion in the first direction is smaller than a print allowance rate of a nozzle positioned in a center portion.

6. The image processor according to claim 1, wherein, the assigning unit assigns the image data in such a manner that, a point in the second direction at which a magnitude relation is exchanged between a rate of assigning data to nozzle of the first nozzle array and a rate of assigning data to nozzle of the third nozzle array in the first range, is different from a point in the second direction at which a magnitude relation is exchanged between a rate of assigning data to nozzle of the second nozzle array and a rate of assigning data to nozzle of the fourth nozzle array in the second range.

7. The image processor according to claim 1, wherein, the assigning unit assigns the image data in such a manner that, in the first range, a rate of assigning data to nozzles of the first nozzle array reduces to be smaller toward an end position of the first chip and a rate of assigning data to nozzles of the third nozzle array reduces to be smaller toward an end position of the second chip, and in the second range, a rate of assigning data to nozzles of the second nozzle array reduces to be smaller toward an end position of the first chip and a rate of assigning data to nozzles of the fourth nozzle array reduces to be smaller toward an end position of the second chip.

8. The image processor according to claim 1, wherein the assigning unit generates a first data corresponding to the first nozzle array and the third nozzle array according to image data corresponding to the overlap region and assigns the image data such that printing of said first data is shared by the first nozzle array and the third nozzle array, and wherein the assigning unit generates a second data corresponding to the second nozzle array and the fourth nozzle array according to image data corresponding to the overlap region and assigns the image data such that printing of said second data is shared by the second nozzle array and the fourth nozzle array.

9. The image processor according to claim 8, wherein the assigning unit assigns the image data in such a manner that data corresponding to a range outside of the first range among the first data is printed by either the first nozzle array or the third nozzle array, and data corresponding to a range outside of the second range among the second data is printed by either the second nozzle array or the fourth nozzle array.

10. An inkjet printer comprising:

a printing unit configured to print an image on a print medium using a print head provided with a first chip and a second chip, the first chip including a first nozzle array and a second nozzle array in each of which a plurality of nozzles for ejecting ink are arranged in a first direction, the second chip including a third nozzle array and a fourth nozzle array in each of which a plurality of nozzles for ejecting ink are arranged in the first direction, wherein the first, second, third and fourth nozzle arrays are arranged in order as the first, the second, the third and the fourth in a second direction intersecting the first direction, and an end of the first nozzle array and an end of the third nozzle array are overlapped and an end of the second nozzle array and an end of the fourth nozzle array are overlapped;

an assigning unit configured to assign an image data corresponding to the overlap region to nozzle arrays of the first chip and the second chip; and a supplying unit configured to supply the image data assigned by the assigning unit to the print head, wherein the assigning unit assigns image data corresponding to a first range of the overlap region to nozzles of the first nozzle array, the second nozzle array and the third nozzle array, and does not assign the first image data to nozzles of the fourth nozzle array, wherein the assigning unit assigns second image data corresponding to a second range of the overlap region which does not overlap with the first range, to nozzles of the second nozzle array, third nozzle array and the fourth nozzle array, does not assign the second image data to nozzles of the first nozzle array, and wherein the assigning unit assigns third image data, corresponding to non-overlap region which is not the overlap region of the first chip, to nozzles of the first nozzle array and the second nozzle array and assigns the fourth image data, corresponding to non-overlap region which is not the overlap region of the second chip, to nozzles of the third nozzle array and the fourth nozzle array.

* * * * *